United States Patent
Jebbar et al.

(10) Patent No.: US 12,287,724 B2
(45) Date of Patent: Apr. 29, 2025

(54) METHODS FOR LIVE TESTING OF SERVICES IN A CLOUD COMPUTING ENVIRONMENT

(71) Applicants: Telefonaktiebolaget LM Ericsson (publ), Stockholm (SE); Oussama Jebbar, Montreal (CA)

(72) Inventors: Oussama Jebbar, Montreal (CA); Maria Toeroe, Montreal (CA); Ferhat Khendek, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 144 days.

(21) Appl. No.: 18/040,117

(22) PCT Filed: Aug. 9, 2021

(86) PCT No.: PCT/IB2021/057344
§ 371 (c)(1),
(2) Date: Jan. 31, 2023

(87) PCT Pub. No.: WO2022/034482
PCT Pub. Date: Feb. 17, 2022

(65) Prior Publication Data
US 2023/0325303 A1    Oct. 12, 2023

Related U.S. Application Data

(60) Provisional application No. 63/063,685, filed on Aug. 10, 2020.

(51) Int. Cl.
*G06F 11/36*    (2006.01)
*G06F 11/3604*    (2025.01)
(Continued)

(52) U.S. Cl.
CPC ...... *G06F 11/3676* (2013.01); *G06F 11/3612* (2013.01); *G06F 11/3664* (2013.01);
(Continued)

(58) Field of Classification Search
CPC ............. G06F 11/3612; G06F 11/3664; G06F 11/3676; G06F 11/3684; G06F 11/3688; G06F 16/128; G06F 3/065
See application file for complete search history.

(56) References Cited

U.S. PATENT DOCUMENTS

2014/0282433 A1\* 9/2014 Eilam ................. G06F 11/3612
717/124
2015/0127618 A1\* 5/2015 Alberti ................. G06F 16/128
707/678
(Continued)

FOREIGN PATENT DOCUMENTS

WO    2019/018720 A1    1/2019

OTHER PUBLICATIONS

Huang et al, CN 110851302, (translation) Feb. 28, 2020, 9 pgs <CN_110851302.pdf>.\*
(Continued)

*Primary Examiner* — Tuan A Vu
(74) *Attorney, Agent, or Firm* — Sonoda & Kobayashi Intellectual Property Law; Sarvajit S. Patil

(57) ABSTRACT

A set of test methods for performing a live test of service in a production environment, where the service is provided by a set of configured instances in the production environment and each configured instance is composed of a set of components. The methods including a method that includes instantiating components under test from the set of components to setup paths that are to be taken by test traffic, instantiating test configuration components for the service, executing a test case on a created path, generating a snapshot
(Continued)

of a first serving component from the set of components, replacing a tested component under test with a second serving component cloned from the snapshot, relocating the service to the second serving component, replacing the serving component of the snapshot with a new component under test to create a new path to be tested, and determining whether all paths have been tested.

10 Claims, 20 Drawing Sheets

(51) Int. Cl.
  *G06F 11/3668*   (2025.01)
  *G06F 3/06*   (2006.01)
  *G06F 16/11*   (2019.01)
(52) U.S. Cl.
  CPC ...... *G06F 11/3684* (2013.01); *G06F 11/3688* (2013.01); *G06F 3/065* (2013.01); *G06F 16/128* (2019.01)

(56) References Cited

U.S. PATENT DOCUMENTS

2018/0314514 A1 11/2018 Garg et al.
2021/0103554 A1* 4/2021 Alluboyina ............. G06F 3/065

OTHER PUBLICATIONS

"Google Cloud Status Dashboard," Feb. 3, 2018, 3 pages, downloaded from https://status.cloud.google.com/incident/appengine/16002, last accessed Jun. 18, 2020.
"Google Cloud Status Dashboard," Jan. 8, 2020, 4 pages, downloaded from https://status.cloud.google.com/incident/appengine/19001, last accessed Jun. 18, 2020.
"Google Cloud Status Dashboard," Jul. 19, 2019, 4 pages, downloaded from https://status.cloud.google.com/incident/cloud-networking/18012, last accessed Jun. 18, 2020.
"Google Cloud Status," Jun. 5, 2015, 2 pages, downloaded from https://status.cloud.google.com/incident/compute/15046, last accessed Jun. 18, 2020.
"Google Could Status Dashboard," Feb. 3, 2018, 3 pages, downloaded from https://status.cloud.google.com/incident/compute/16012, last accessed Jun. 18, 2020.
"Linux containers," 2020, 3 pages, downloaded from https://www.linuxcontainers.org, last accessed Jun. 18, 2020.
"RCA—Multiple Services—Downstream impact from Azure Front Door," Nov. 20, 2019, 1 page, downloaded from https://status.azure.com/en-us/status/history/, last accessed Jun. 18, 2020.
Alberto González Sánchez, "Cost Optimizations in Runtime Testing and Diagnosis," 2011, 176 pages, Phd Thesis, Delft University of Technology.
Blue-green, 2019, 3 pages, downloaded from https://docs.cloudfoundry.org/devguide/deploy-apps/blue-green.html, last accessed Jun. 18, 2020.
Bo Yang et al., "Survey and Evaluation of Blue-Green Deployment Techniques in Cloud Native Environments", 2020, pp. 69-81, Service-Oriented Computing—ICSOC 2019 Workshops, Lecture Notes in Computer Science (LNCS) 12019.
Chunqiang Tang et al., "Holistic Configuration Management at Facebook," 2015, pp. 1-16, In Proceedings of the 25th Symposium on Operating Systems Principles, SOSP'15, ACM.
Daniel Brenner et al., "Reducing Verification Effort in Component-Based Software Engineering through Built-In Testing," 2007, pp. 151-162, Inf. Syst. Front. 9(2-3).
Dima Suliman et al., "The Morabit Approach to Runtime Component Testing," 2006, pp. 171-176, Proceedings of the 30th Annual International Computer Software and Applications Conference (COMPSAC'06), vol. 02, IEEE.
Docker, 2020, 3 pages, downloaded from https://www.docker.com, last accessed Jun. 18, 2020.
Dominik Ernst et al., "Rapid Canary Assessment Through Proxying and Two-Stage Load Balancing", Mar. 25, 2019, pp. 116-122, 2019 IEEE International Conference on Software Architecture Companion (ICSA-C), IEEE.
Dror G. Feitelson et al., "Development and Deployment at Facebook," 2013, 14 pages, IEEE Internet Computing.
Ellard T. Roush, "Cluster Rolling Upgrade using Multiple Version Support," 2001, pp. 1-8, Proceedings of the 2001 IEEE International Conference on Cluster Computing (CLUSTER'01).
ETSI ES 201 873-5 V4.8.1., "Methods for Testing and Specification (MTS); The Testing and Test Control Notation version 3; Part 5: TTCN-3 Runtime Interface (TRI)," May 2017, 93 pages, European Telecommunications Standards Institute.
International Preliminary Report on Patentability, PCT App. No. PCT/IB2021/057344, Feb. 23, 2023, 15 pages.
International Search Report and Written Opinion, PCT App. No. PCT/IB2021/057344, Feb. 7, 2022, 22 pages.
Invitation to Pay Additional Fees, PCT App. No. PCT/IB2021/057344, Dec. 14, 2021, 14 pages.
Kihwal Lee et al., "A Dependable Online Testing and Upgrade Architecture for Real-Time Embedded Systems," 2005, 6 pages, Proceedings of the 11th IEEE International Conference on Embedded and Real-Time Computing Systems and Applications (RTCSA'05), IEEE.
Kubernetes, 2020, 4 pages, downloaded from https://www.kubernetes.io, last accessed Jun. 18, 2020.
Mariam Lahami et al., "Safe and efficient runtime testing framework applied in dynamic and distributed systems," 2016, pp. 1-28, Science of Computer Programming 122.
Openstack, 2020, 6 pages, downloaded from https://www.openstack.org, last accessed Jun. 18, 2020.
Oussama Jebbar et al., "Architecture for the Automation of Live Testing of Cloud Systems," 2020, pp. 142-151, 2020 IEEE 20th International Conference on Software Quality, Reliability, and Security (QRS), IEEE.
Oussama Jebbar et al., "Regression Test Suite Reduction for Cloud Systems", Aug. 4, 2020, pp. 477-486, 2020 IEEE International Conference on Software Testing, Verification and Validation Workshops (ICSTW), IEEE.
Rogério De Lemos et al., "Software Engineering for Self-Adaptive Systems: A Second Research Roadmap," 2013, 33 pages, In: Software Engineering for Self-Adaptive Systems II, Lecture Notes in Computer Science, vol. 7475, Springer.
Tirthankar Das et al., "Quantum Leap Cluster Upgrade," 2009, 4 pages, Proceedings of the 2nd Bangalore Annual Compute Conference, ACM.
Xue Ouyang et al., "Delayed Switch: Cloud Service Upgrade with Low Availability and Capacity Loss," 2014, pp. 1158-1161, IEEE 5th International Conference on Software Engineering and Service Science.

* cited by examiner

Test configuration component
 Serving component
 Component under test
 Serving component under test Test configuration component
 Serving component
 Component under test Test configuration component
 Serving component
 Component under test Test configuration component  Serving component  Component under test

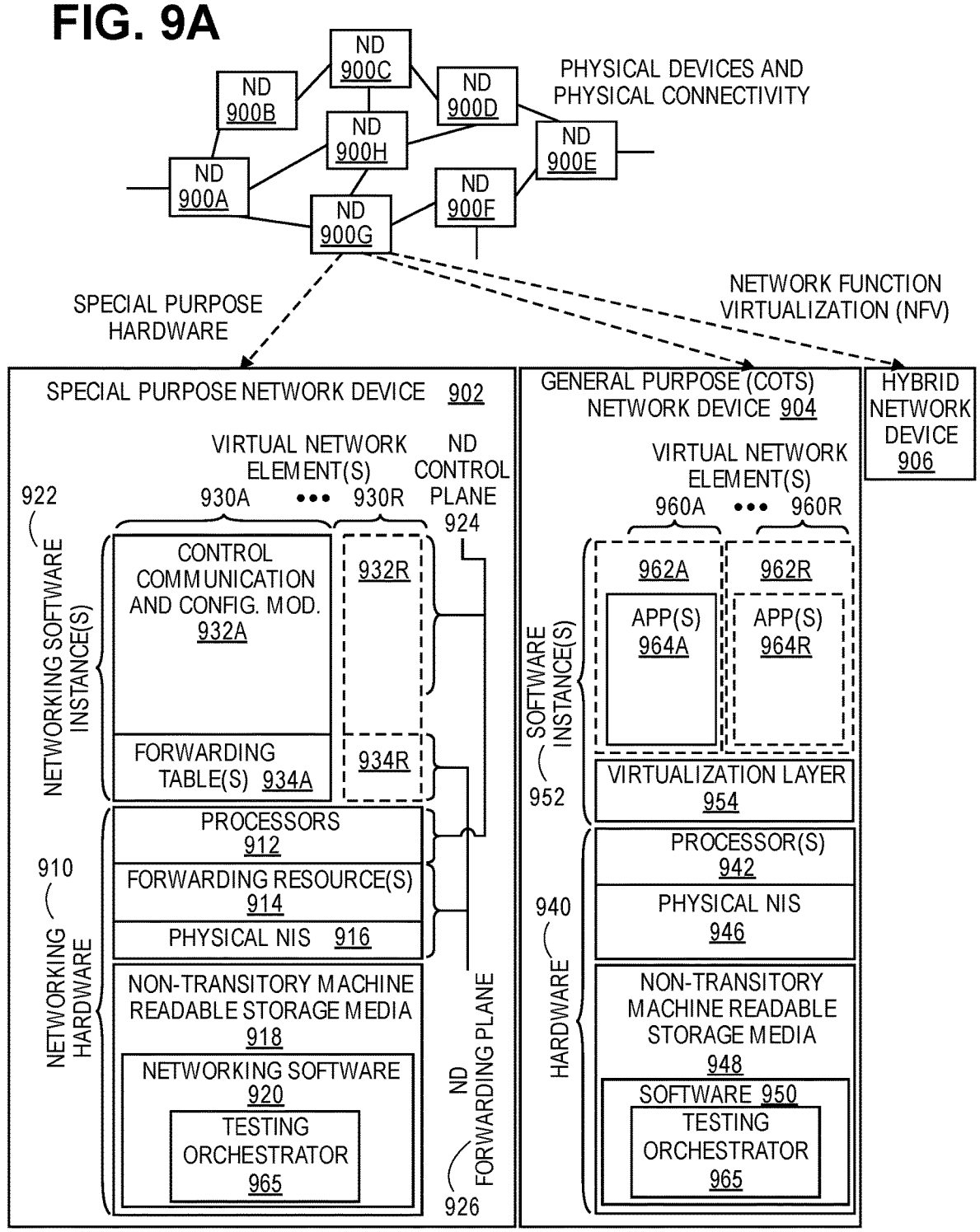

METHODS FOR LIVE TESTING OF SERVICES IN A CLOUD COMPUTING ENVIRONMENT

CROSS-REFERENCE TO RELATED APPLICATIONS

This application is a National stage of International Application No. PCT/IB2021/057344, filed Aug. 9, 2021, which claims the benefit of U.S. Provisional Application No. 63/063,685, filed Aug. 10, 2020, which is are hereby incorporated by reference.

TECHNICAL FIELD

Embodiments of the invention relate to the field of services in a cloud computing; and more specifically, to methods and systems for the live testing of services in cloud computing environment.

BACKGROUND ART

A cloud computing environment is a commonly adopted paradigm due to the flexibility of resource provisioning and the improved resource utilization it enables. Whether the cloud computing environment is a dedicated computing environment (e.g., a private cloud computing environment) or a shared computing environment (e.g., a public cloud computing environment), a cloud computing environment is considered a complex system due to its scale and the configurations involved in its setup and management. The complexity of a cloud computing environment makes testing new services and functions difficult to accomplish without interruption of the current services and functions of the cloud computing environment. Part of the difficulty in testing lies in the difference between the test environment (e.g., a lab, a staged computing environment, a development environment or similar testing environment) and the cloud computing environment. In particular, the operations of a live cloud computing environment, i.e., a production environment, can impact software engineering activities such as software testing that are attempted in the cloud computing environment while normal operations are ongoing.

Testing solely in an offline test environment, i.e., not within the target cloud computing environment, is not viewed as sufficient anymore by software developers and cloud computing environment administrators. In some cases, errors in deployed services manifest as a result of the new code and configuration being exposed to a specific traffic pattern not known/considered pre-deployment. To reveal such scenarios, services hosted in clouds need to be re-tested in their production environments because, the multiple configurations involved in a cloud computing environment lead to differences between the configurations used in the test environment and the ones deployed in production, and cloud computing environments may be subject to unexpected scenarios (requests or traffic patterns) that may not have been covered by testing activities in dedicated testing environments.

SUMMARY

In one embodiment, a method is provided to live test a service in a production environment, where the method includes identifying executing components for the service, instantiating components under test to setup paths that are to be taken by test traffic, instantiating test configuration components for the service, and testing each of the paths.

In another embodiment, another method is provided to live test a service in a production environment, where the service is provided by a set of configured instances in the production environment, and each configured instance is composed of a set of components, where the method includes instantiating components under test from the set of components to setup paths that are to be taken by test traffic, instantiating test configuration components from the set of components for the service, executing a test case on a created path, generating a snapshot of a first serving component from the set of components, replacing a tested component under test from the set of components with a second serving component from the set of components cloned from the snapshot, relocating the service to the second serving component, replacing the first serving component of the snapshot with a new component under test to create a new path to be tested, and determining whether all paths have been tested.

In a further embodiment, a further method is provided to live test a service in a production environment, where the method includes instantiating k components under test for the configured instance being tested on k available nodes where k is any number greater than zero, instantiating the test configuration components, testing all paths which can be executed and which involve the k instantiated components under test until all path have been tested, generating a snapshot for each of the k serving components, replacing the k components under test with k serving components cloned from the snapshot, relocating production traffic to k new serving components, and executing the test cases for components on the remaining nodes using a single step test method.

In one embodiment, a method is provided to live test a service in a production environment, where the method includes creating a new configured instance as a test configured instance, creating test configuration components to test each path and executing a test case, generating a snapshot of the original configured instance to be tested, in response to all tests being completed, replacing the test configured instance with an instance cloned from the snapshot, relocating the production traffic to the test configured instance, and removing the original configured instance from the live cloud computing environment.

In one embodiment, a method is provided to live test a service in a production environment, where the method includes determining a set of test methods with their coverage criteria to be executed, calculating boundary environments for the set of test methods, applying the boundary environments according to the coverage criteria to the selected test methods, and executing the selected test methods.

BRIEF DESCRIPTION OF THE DRAWINGS

The invention may best be understood by referring to the following description and accompanying drawings that are used to illustrate embodiments of the invention. In the drawings:

FIG. 9A illustrates connectivity between network devices (NDs) within an exemplary network, as well as three exemplary implementations of the NDs, according to some embodiments of the invention.

FIG. 9B illustrates an exemplary way to implement a special-purpose network device according to some embodiments of the invention.

DETAILED DESCRIPTION

Figure 1:
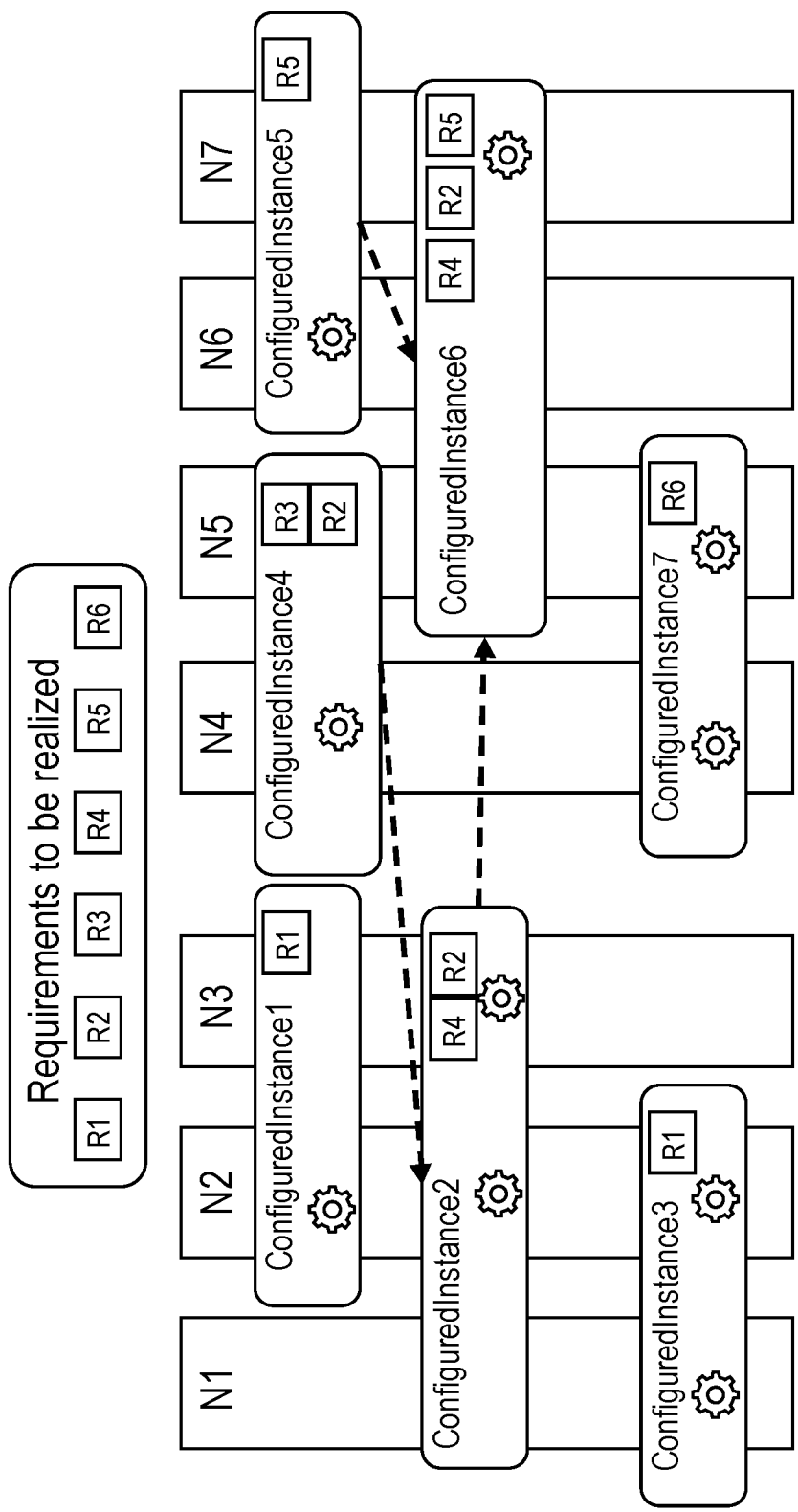
FIG. 1 is a diagram of one example cloud computing environment with a set of configured instances executing across a set of nodes in the cloud computing environment.

The following description describes methods and apparatus for live testing in a cloud computing environment. The embodiments provide a set of test methods including the single step, rolling path, small flip, and big flip testing methods. These testing methods can be used under different circumstances to test services in an active cloud computing environment, referred to herein as a production environment. In all cases, additional test configuration components are used to ensure that enough runtime configuration states are tested to produce a meaningful test result. Since testing all runtime configuration states is generally not feasible, the set of runtime configuration states that are tested is reduced by application of boundary environments is introduced. Based on the combinations of boundary environment and different coverage criteria that have been defined the subset of runtime configuration states to be tested can be reduced.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The cloud computing environment is a complex system due to its scale and the large variations in possible configurations involved in its setup and management. This creates a problem for testing of services to be deployed to the cloud computing environment due to the difference between the test environment (e.g., testing lab, staging, development environment and similar test environment conditions) and the cloud computing environment as the target production environment. These differences impact software engineering activities such as software testing. Services hosted in a cloud computing environment need to be re-tested in their production environments because the multiple configurations involved in a cloud computing environment lead to differences between the configurations used in the test environment and the ones deployed in production, and cloud computing environments are subject to unexpected scenarios (requests or traffic patterns) that may not have been covered by testing activities.

Live testing is testing a service in its production environment without causing an intolerable disruption to the production environment. Live testing becomes more challenging as the tolerable disruption constraints become more stringent as in the case of carrier grade services (i.e., mobile network operators and similar telecommunication network operators). Interferences between test traffic and production traffic are among the main challenges of live testing as they result in violations of one or more of the functional or non-functional requirements of the cloud computing environment.

Test methods can attempt to alleviate the risk associated with interference between the live testing and the normal operation of the production environment. This can include assessing the runtime testability of the system under test (SUT) using a set of available test methods that can provide isolation, and proposing methods for test case selection that can balance between reducing the cost of runtime testability and the cost of runtime diagnosis. Other approaches attempt to alleviate the risk of interference between the live testing and the normal operation of the production environment using built-in modules called Built-In Tests (BITs) to be able to test a system in production. The testing and test control notation (TTCN) Test System Reference Architecture can also be extended to orchestrate test case execution in production, it is limited to using TTCN in OSGi managed JAVA systems.

The embodiments can be utilized in combination with other test methods such as canary releases, gradual rollouts and dark launches leverage the use of production traffic for testing purposes. In canary releases a new version of an existing feature is released to a subset of customers for a period of time, the new version will be then released to all the customers only if it does not show any problems during this testing period.

Blue-Green deployment is a technique that is used to enable zero downtime live upgrade and testing. It consists of maintaining two identical production environments, Blue and Green. One of them is used to handle the production traffic and the second remains idle. When it is time for an upgrade, the idle environment will be upgraded and tested. If the new setup passes all the tests the production traffic will be redirected to the idle environment and the active environment will go to the idle state.

In addition to live testing, software upgrades are another management activity that is being performed on live production environments. The main challenge of live upgrade is the impact it may have on the system's availability especially when the old version and the new version of the software are not compatible.

Existing testing methods and processes fail to adequately test services for cloud computing environments in many cases. These existing testing methods fail to thoroughly test service for a variety of reasons. Some existing testing methods rely on duplicating the production traffic for testing purpose. Basic canary releases, gradual roll outs, and dark launches have limited applicability as they can only be used to test new versions of existing feature, i.e., they are not applicable for new features for which there is no production traffic to duplicate. The same issues apply for existing testing methods such as Simplex, by Liu Sha, which is a method used for live upgrade and testing of real time embedded systems. The major problems with the Blue-Green approach are that it comes at a high cost from a resource perspective, it poses the challenge of maintaining two environments in synchronization, and is not scalable to use with large scale systems.

The embodiments overcome these limitations of the prior art. The embodiments provide a set of test methods referred to as 'single step,' 'rolling path,' 'small flip,' and 'big flip,' which can be used under different circumstances to test services in the production environment. The single step test method can be applied when the testing activities do not interfere with production traffic. The other three methods are used when such interference may exist as they run the test cases on components which do not serve production traffic to avoid any interferences. The three methods are applicable depending on the amount of resources that can be used for testing.

In the embodiments, additional test configuration components are used to ensure that enough runtime configuration states are tested to produce a meaningful test result. Since testing all runtime configuration states is impossible or at least not feasible for most production environments, the embodiments identify boundary environments to reduce the number of test conditions to be tested. Based on the combinations of boundary environment with different coverage criteria a subset of the possible runtime configuration states is identified to reduce the configuration state space to be tested. Thus, the embodiments provide advantages over the existing art. The embodiments provide test methods that can be utilized for live testing in production environments. The embodiments of the provided test methods enable the running of test cases, which can cover the entire space of runtime configuration states. Using boundary environments and coverage criteria the embodiments reduce the space without sacrificing the error detection power of the test methods.

As used herein, 'live testing,' refers to testing a service in its production environment environment without causing any intolerable disturbance to the production environment. The embodiment enables live testing without causing an intolerable disruption to the operation of the production environment. Live testing becomes more challenging as the tolerable disruption constraints become more stringent as in the case of carrier grade services (e.g., mobile network and similar telecommunication networks). Interferences between test traffic and production traffic are among the main challenges of live testing as they result in violations of one or more of the functional or non-functional requirements of the cloud computing environment. Test interferences may be due to internal characteristics of the services being tested (e.g., statefulness, nature of interactions, and similar characteristics), or the shared resources among services hosted in the same production environment. Test interferences can manifest at the level of the services being tested or at the level of other services that share resources with them.

Cloud computing environments enable users, referred to as tenants, to utilize the resources of the cloud computing environment. The cloud computing environments accommodate tenants that have a varying range of requirements. To reduce the cost of their services, cloud computing environment providers build their systems using configurable software which can be configured differently to satisfy different requirements. Configurations can be of different types, tenant configuration, application configuration, or deployment configuration. Applying a set of such configurations to a configurable software yields a configured instance to be deployed in the cloud computing environment. Thus, as used herein a 'configured instance' refers to a specific configuration of the configurable software for a service provided by the configurable software deployed in a cloud computing environment.

Tenant requirements are realized using services. A 'service,' as used herein, consists of a set of service instances chained together to compose the service. A 'set,' as used herein, refers to any whole number of items including a single item. A 'service instance,' as used herein, is the workload which is assigned to a single configured instance. Service providers create service instances using configurations of all the different types, tenant configuration, application configuration, or deployment configuration. These configurations play various roles in tuning the behaviour of the configurable software. Tenant configurations for instance are used to parametrize the service instances composing the service of a specific tenant. Application configurations are used to expose/refine features of the configurable software which may be required to be parameterized differently for different tenants. When instantiated, a configured instance yields a set of components which are providing the actual service instance. The number of such components, their locations, their interactions with components of other configured instances, the policies that govern the number of such components, and similar aspects are aspects set using deployment configurations.

A configured instance may be deployed on several physical or virtual nodes in a cloud computing environment, i.e., the components of the configured instance can run on any of the nodes on which it is deployed. Such design is usually used for capacity and/or fault tolerance purposes. Therefore, at any moment of the cloud computing environment's lifespan, the components of configured instances may run on the same nodes, on different nodes, bounded to the same or different components of another configured instance, or similarly distributed. The locations of those components, their numbers per configured instance, and their binding information is called a runtime configuration state. The set of runtime configuration states in which a system can be depends on the system's configuration, and it is also called the viability zone when talking about self-adaptive systems. When the system is in a given runtime configuration state, each component of a configured instance is located on a specific node, in a specific network, sharing that node with a set of components from other configured instances. The location information (e.g., the node and network) and collocation information define the component environment under which the component is actually serving. Therefore, a runtime configuration state is identified by the set of component environments under which the components of the configured instances are serving when the system is in that runtime configuration state.

Furthermore, the embodiments can also identify runtime configuration states by the component environments under which the service instances that compose each service are provided. For each service, such a combination of component environments is referred to herein as 'the path' through which the service is provided. Note that for services that are composed of a single service instance the concept of path coincides with the concept of component environment as there are no combinations of component environments to consider at this level. As a result, the concept of path, as used herein, is not to be confused with path in white box testing which may refer to control flow path or data flow path. To evaluate the compliance of the services with the requirements, cloud computing environment providers have test cases they run as needed. These test cases may involve one or more configured instances depending on the realization of the requirements the test case covers.

FIG. 1 is a diagram of one embodiment of an example cloud computing environment. In this example cloud computing environment, a set of configured instances (configuredInstance1-7) are deployed across a set of nodes N1-N7. The 'nodes,' as used herein are physical or virtual machines that are capable of executing the services within the cloud computing environment. The requirements characterize functionally and non-functionally the services to be delivered. They may express constraints or resource needs of the operation of a service instance as implemented in the illustrated configured instances that are to be satisfied by the cloud computing environment. The set of requirements to be met by the cloud computing environment are labelled R1-R6. In this example, some requirements such as requirement R3 are realized using services composed of a single service instance (e.g., assigned to ConfiguredInstance4). Other requirements such as R2 are realized through services that are compositions of more than one service instance (e.g., service instances assigned to ConfiguredInstance2, ConfiguredInstance4, and ConfiguredInstance6). The example embodiment of FIG. 1 also captures a runtime configuration state where ConfiguredInstance2, ConfiguredInstance3, and ConfiguredInstance7 have two components running (illustrated as 'gears' in FIG. 1), while the rest of the configured instances have only one component running at this point in time. These numbers of components can change as a result of configured instances scaling in or out.

The embodiments can identify and describe the component environment under which the components of ConfiguredInstance4, for instance, is serving as {location: N4, collocation: components of {ConfiguredInstance7}}. The term 'component environment,' as used herein refers to an environment of component of a configured instance. The embodiments can also describe the paths taken by the service realizing R2, for instance, when the system is in this runtime configuration state. These paths in the illustrated example are as follows: Path1 includes a component of ConfiguredInstance4 ({location: N4, collocation: components of {ConfiguredInstance7}}), a component of ConfiguredInstance2 ({location: N2, collocation: comps of {ConfiguredInstance2, ConfiguredInstance3}}), and a component of ConfiguredInstance6 ({location: N7, collocation: none}).

The example of FIG. 1 includes a second Path2 that includes a component of ConfiguredInstance4 ({location: N4, collocation: comps of {ConfiguredInstance7}}), component of ConfiguredInstance2 ({location: N3, collocation: none}), and a component of ConfiguredInstance6 ({location: N7, collocation: none}).

Thus, the example of FIG. 1 illustrates a case where the embodiments could be applied to improve testing for services in the cloud computing environment. The example of FIG. 1 is provided by way of illustration and not limitation to facilitate understanding of the embodiments.

The embodiments provide a set of live testing methods that are designed to avoid interferences between test traffic and the production traffic of different conditions, i.e. configured instances with different characteristics. The embodiments provide processes that are independent from the platform of the configured instances under test, and do not impose any constraints on the structure or features of the configured instances being tested. The embodiments provide processes that are independent of the test case and the feature being tested. In other words, the embodiment enable any test case running on any feature to be run safely, without limiting the applicability of our test methods only to specific test cases, such as existing test cases or test cases that cover features that have already been tested. The embodiments provide processes that are capable of covering all runtime configuration states. To achieve these conditions the coverage of runtime configuration states is incorporated into the test methods of the embodiments. The embodiments utilize features of the cloud computing environment in which the configured instances run including the capability for snapshot-and-clone, where the cloud computing environment has the capability to snapshot the components of the configured instances composing the production environment. The snapshot image that is taken should be enough to clone these components. The cloud computing environment also has the capability to clone a component from a snapshot. The embodiments also utilize service-relocation where the cloud computing environment has the capability of relocating service assignments from one component to another.

These features are regularly provided by cloud computing environments. Due to containerization, snapshotting and cloning, for instance, can be done independent of the technologies used to realize the configured instances. Tools such as checkpoint/restore in userspace (CRIU) enable the snapshotting and cloning of processes running in various container technologies such as Docker, by Docker, Inc. and LXC, in the Linux operating system. Furthermore, production like setups containerize even infrastructure services (e.g., kubelet and kubeproxy for Kubernetes, nova and neutron for Openstack), which makes this assumption applicable also to infrastructure services. Service relocation is a feature also supported by cloud orchestrators. Such feature is usually needed to meet Quality of Service (QoS) requirements such as availability and service continuity. However, not all orchestrators may support service continuity.

Figure 2:
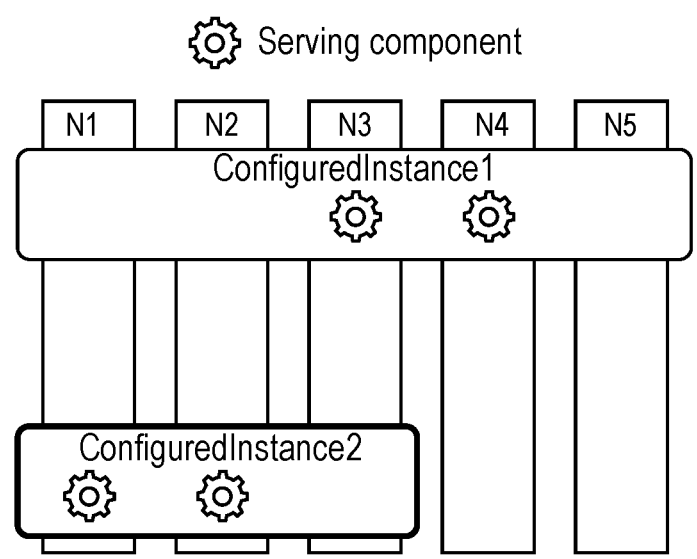
FIG. 2 is a diagram of one embodiment of a setup of an example cloud computing environment to illustrate concepts of the test methods.

FIG. 2 is a diagram of a simplified cloud computing environment example. The example shows a setup on which basic concepts used in the embodiments of the test methods are explained. The example cloud computing environment supports two configured instances which share three out of five nodes in the cloud computing environment. The two configured instances share nodes N1, N2, N3, while nodes N4 and N5 are only be used by ConfiguredInstance1. At the illustrated time of the testing, ConfiguredInstance1 and ConfiguredInstance2 have two components each.

To cover all runtime configurations states of the system, a live test should reproduce each of these states. Therefore, during testing a component plays one of three roles (1) as a serving component, which is a component that handles production traffic, (2) as a component under test, which is a component that receives the test traffic, and (3) as a test configuration component, which is a component that is not under test, and which receives duplicated production traffic, but does not handle it. Such components are used to recreate the runtime configuration state corresponding to the component being tested.

The set of paths that need to be covered for testing a service composed of a single service instance provided by ConfiguredInstane2 include but is not limited to a Path1 ({location: N1, collocation: components of {ConfiguredInstance1}}). If the process starts from the runtime configuration state illustrated in FIG. 2, this will imply instantiating a test configuration component for ConfiguredInstance1 on N1, while having the component of ConfiguredInstance2 on N1 as the component under test.

The set of paths can also include Path2 ({location: N2, collocation: components of {ConfiguredInstance1}}). If the process starts from the runtime configuration state illustrated in FIG. 2, this will imply instantiating a test configuration component for ConfiguredInstance1 on N2, while having the component of ConfiguredInstance2 on N2 as the component under test.

Figure 3A:
FIGS. 3A-3C are diagrams of a cloud computing environment where a single step testing method is utilized.
Figure 3A:
Figure 3A:
Figure 3A:
Figure 3A:
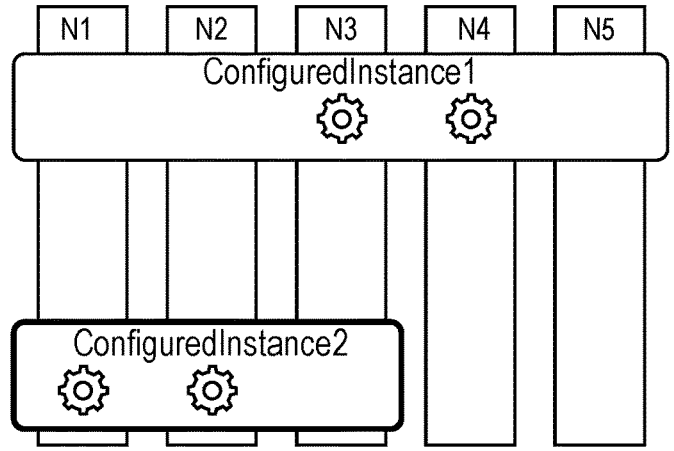
Figure 3B:
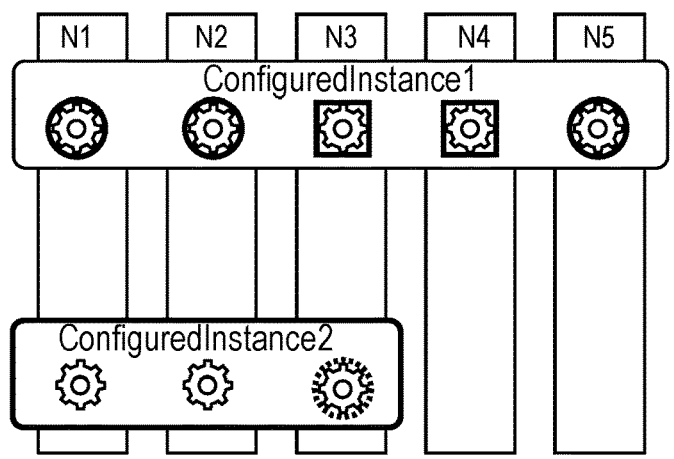
Figure 3C:
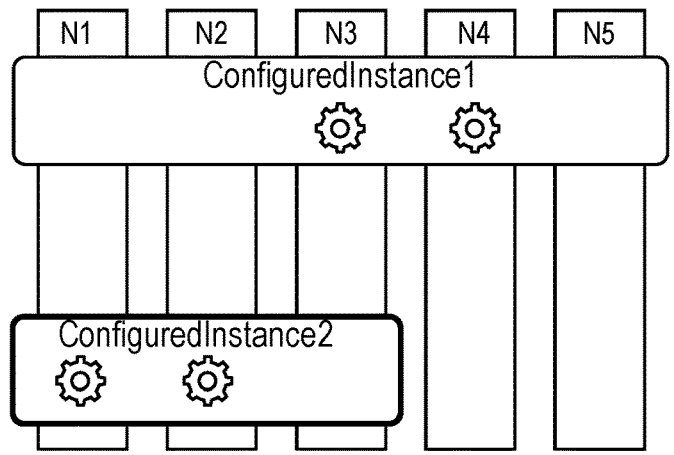
Figure 3D:
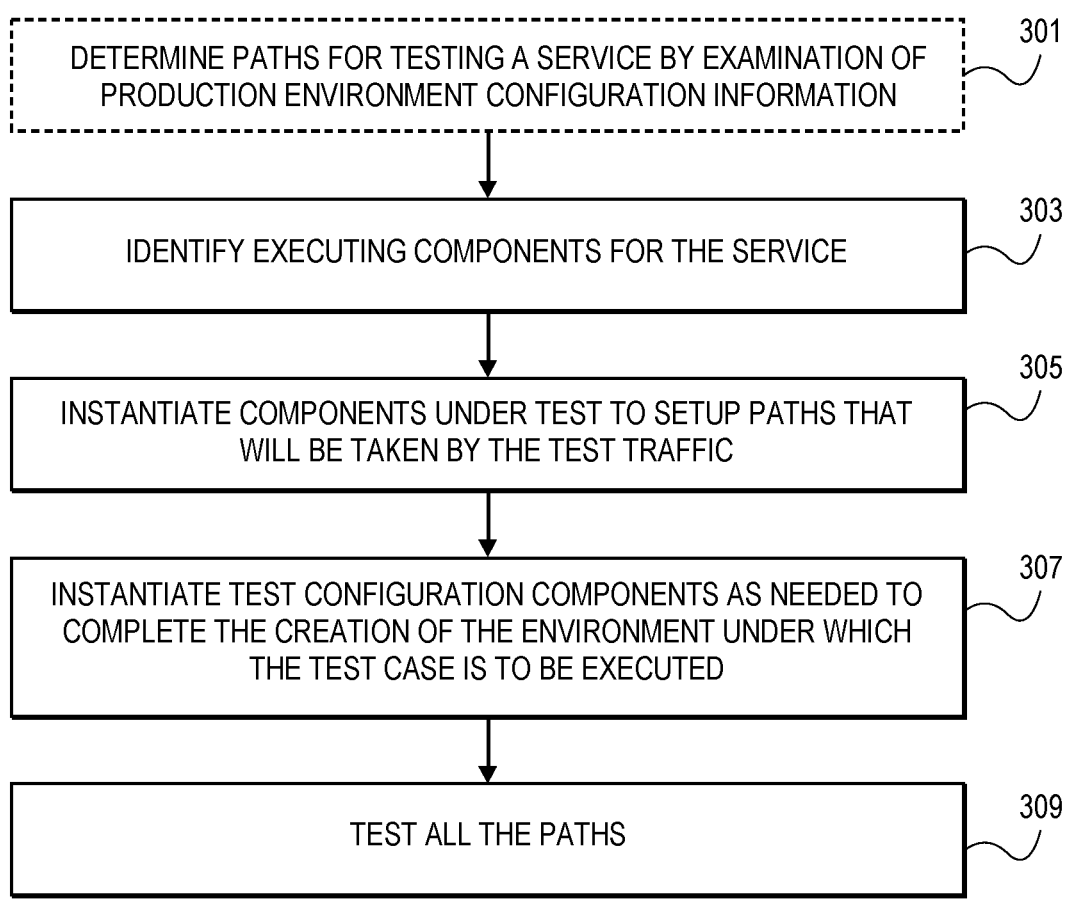
FIG. 3D is a flowchart of one embodiment of the single step testing process.

The set of paths can include Path3 ({location: N3, collocation: components of {ConfiguredInstance1}}). If the process starts from the runtime configuration state illustrated in FIG. 2, this will imply instantiating a component of ConfiguredInstance2 on N3 as the component under test while ConfiguredInstance1 already has its component on N3 handling production traffic, so it is a serving component. To identify all paths, the process generates all combinations of the potential locations of the components of different configured instances providing a service instance of the provided service. The process also identifies, for each potential location, the potential collocations FIGS. 3A-3C are diagrams of a cloud computing environment where a single step testing method is utilized. This test method and the other test methods described herein are applicable at configured instance level and not at path level. That is, to test a service which is a composition of more than one service instance that is provided by different configured instances, the embodiments may use different test methods for the different configured instances on the path providing the service. Furthermore, the testing methods may test the service for all the paths or a selected subset of the paths through which it can be provided. The testing method illustrated in FIGS. 3A-3C and described in relation to the flowchart of FIG. 3D is referred to herein as a 'single step' testing method.

The single step test method can be used for configured instances with no potential risk of interference between the live testing and the production environment, i.e., when the testing activities have no impact on the configured instances behaviour. Executing a test case for a configured instance is described with reference to the flowchart of FIG. 3D for the single step test method.

The operations in the flowcharts will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The process of the single step test can start with determining paths for testing a service by examination of configuration information for each configured instance for that service (Block 301). The process continues by identifying the components that are already executing in the configured instances in the production environment (Block 303). Where there are already executing components, these components do not have to be instantiated by the single test process. The process then instantiates components under test that are not already executing to setup the paths that will be taken by the test traffic for each configured instance (Block 305). The process then instantiates test configuration components as needed to complete the creation of the production environment under which the test case is to be executed (Block 307). The testing is then executed to test all of the different paths identified for the service to be tested (Block 309).

Returning to FIGS. 3A-C, which illustrates the iterations for using the single step method to test a service composed of one service instance which is provided by ConfiguredInstance1. From the configuration of ConfiguredInstance1, the process can determine that the service can be provided through one of eight paths (i.e., one of eight component environments in the case of a service composed of a single service instance). That is, ConfiguredInstance1 can have a component on any of the five nodes it is configured for and any of these may serve a service instance. Out of these five potential components three may or may not be collocated with components of ConfiguredInstance2, resulting in three more possibilities for the collocation portion of the path description. As shown in FIGS. 3A-3C the process can test five paths at a time using this test method. The Figures shows five out of the eight paths tested. These are the five possible locations of a component of ConfiguredInstance1 that can serve the service instance combined with their collocation with components of ConfiguredInstance2. Since there is no potential risk of interferences in this case, components of ConfiguredInstance1 are allowed to handle test traffic and production traffic at the same time. Therefore, test components are instantiated on an as-needed basis. Starting from the runtime configuration state in FIG. 3A, the test progresses to the state of FIG. 3B, for instance, for ConfiguredInstance1 the process instantiates test components on nodes N1, N2, and N5, but for N3 and N4 the process utilizes the components which already handle production traffic, i.e., these components play two roles: serving component and component under test (marked as serving component under test in FIG. 3B). Similarly, the instantiation of test configuration components is not necessary as existing serving components help to create the environments under which the process is to execute the test. However, in the absence of such components, the process instantiates test configuration components as it is the case for ConfigurationInstance2 on node N3 in FIG. 3B. FIG. 3C shows the runtime configuration state after completing the single step test method, which returns the production environment to the original state (e.g., as illustrated in FIG. 3A).

FIG. 4A-4E are diagrams of one example embodiment of the rolling path testing method. FIG. 4F is a flowchart of the rolling path testing process. The rolling paths test method can be used in situations where testing may impact the configured instance to be tested (therefore, the existing serving components under test cannot be used), and the total cost of isolation mechanisms such as snapshot-and-clone and service-relocation is not too high in terms of causing intolerable disruption to the service. The example describes the rolling paths test method can be applied to a single configured instance. However, one skilled in the art would understand that the same principles and structures can be applied to production environments with any number of services.

As illustrated in the flowchart of FIG. 4F, the rolling path process can begin with determining paths for testing a service by examination of configuration information for each configured instance for that service (Block 401). The process continues with instantiating a component under test to create the path that will be taken by the test case (Block 403). The process then instantiates test configuration components as needed to setup the component environments under which the test component should undergo testing (Block 405). The test case is then executed on the created path (Block 407). A snapshot of a serving component is created and the process replaces the already tested component under test with a serving component cloned from the snapshot (Block 409). The process then relocates the service to the new serving component (Block 411).

The snapshotted serving component is replaced with a component under test to create a new path to be tested (Block 413). A check is made to determine whether all of the paths or a selected subset of the paths have been tested (Block 413). As is discussed further herein below, in some embodiments, boundary environments and coverage criteria can be utilized to reduce the number of paths to be tested to a selected subset of all of the paths. If all of the paths (or the selected subset) are tested, the process completes. If any paths remain to be tested, then the process continues to set up the next path (Block 403).

Figure 4A:
FIG. 4A-4E is a diagram of one embodiment of an iteration of a rolling path testing method.
Figure 4A:
Figure 4A:
Figure 4A:
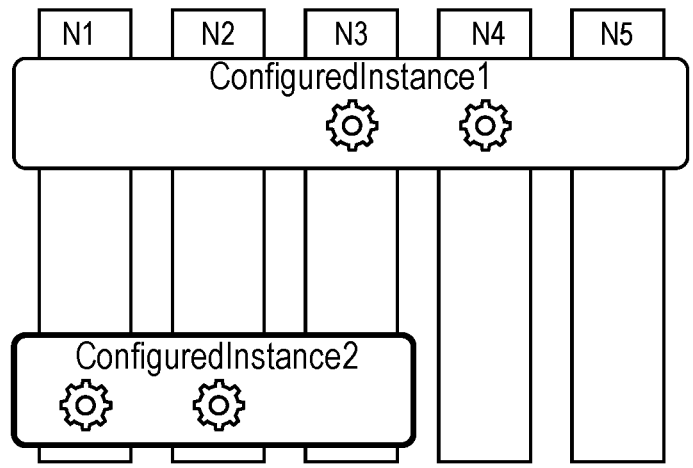
Figure 4B:
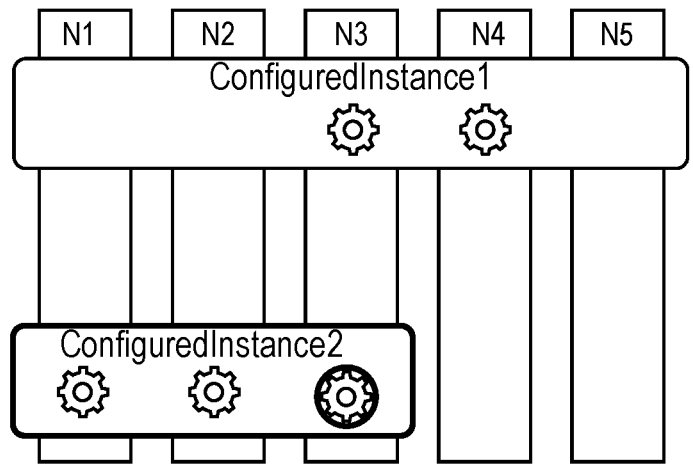
Figure 4C:
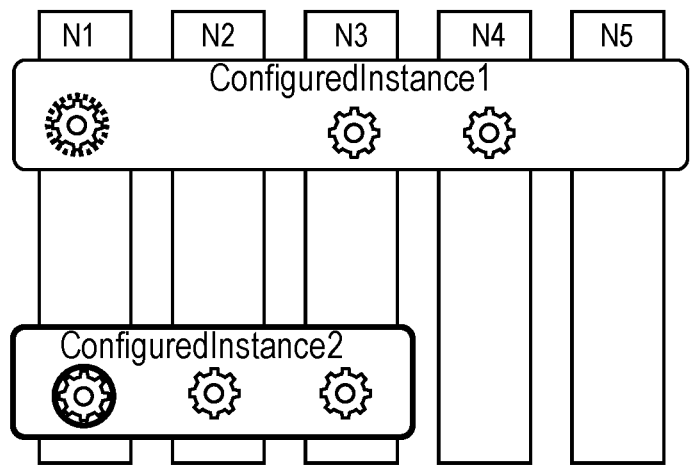
Figure 4D:
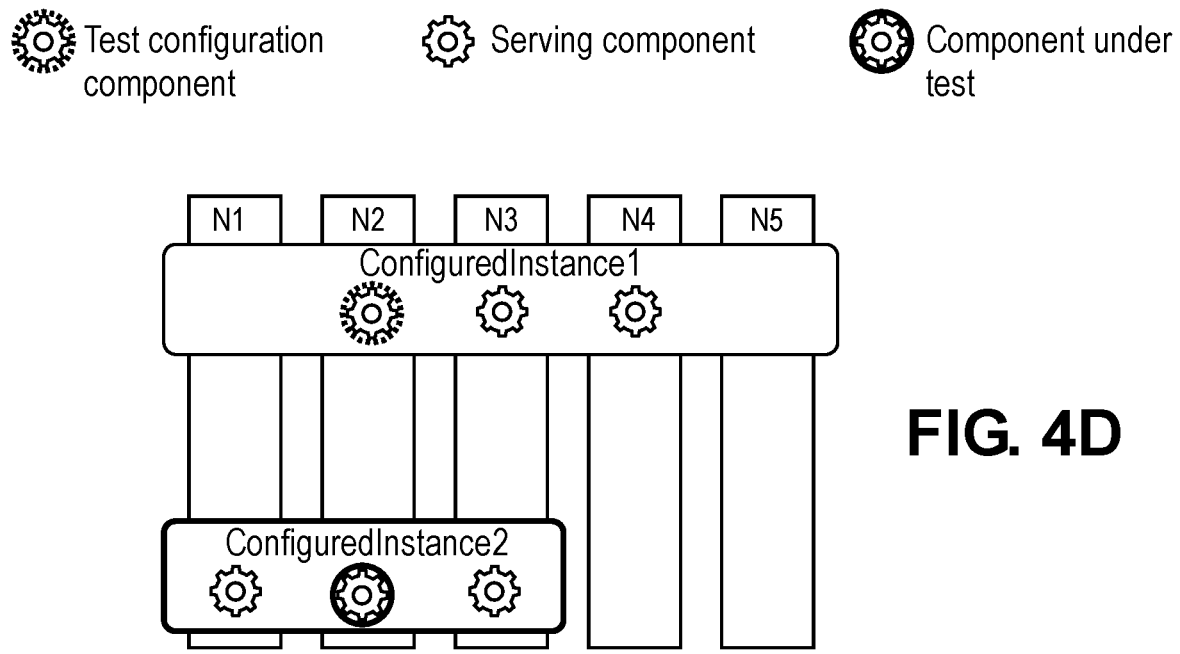
Figure 4E:
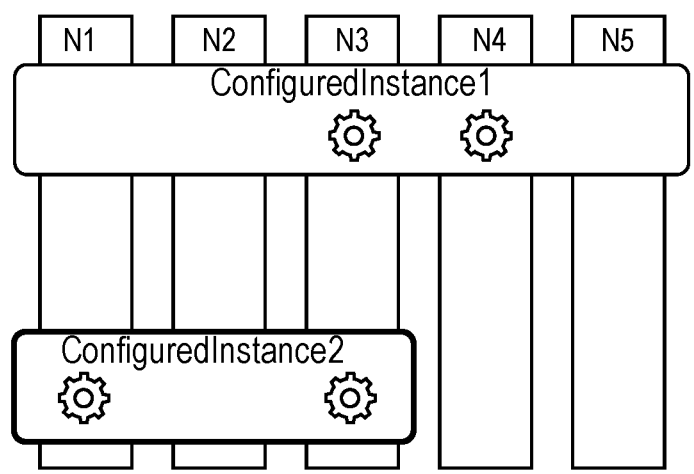
Figure 4F:
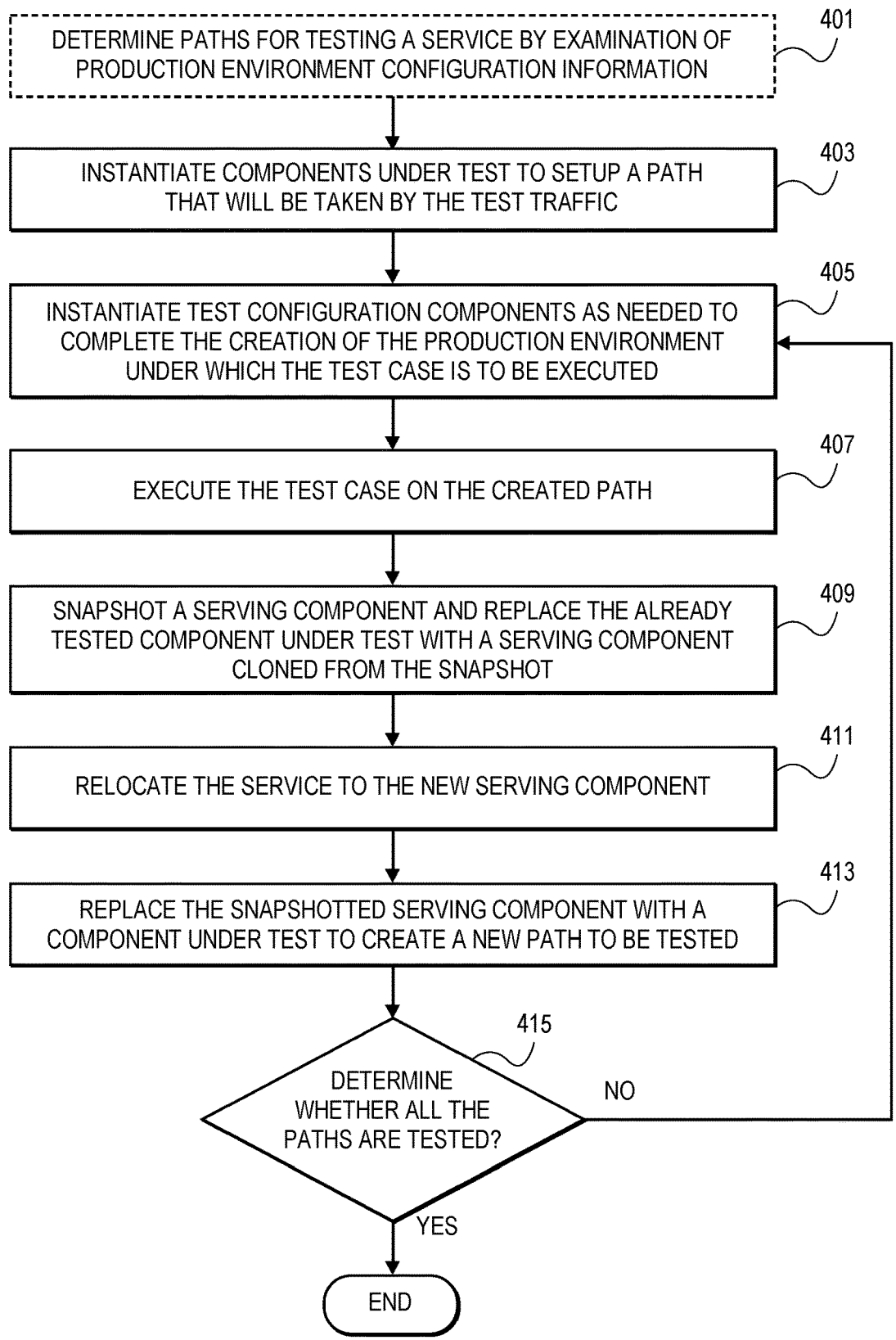
FIG. 4F is a flowchart of one embodiment of the rolling path testing process.

FIGS. 4A-4E illustrates some iterations of the rolling paths test method when used to test a service composed of a single service instance which is provided by ConfiguredInstance2. There are six paths to be exercised by the test case. Unlike the single step, the rolling paths is used when there is a potential risk of interferences, therefore test traffic has to be isolated from production traffic. As a result, unless there are enough resources, one cannot test multiple paths at the same time. The initial state of the cloud computing environment is shown in FIG. 4A. A single path is created at each iteration by instantiating the necessary components under test and test configuration components as shown in FIGS. 4B, 4C, and 4D. After executing the test case in each iteration, the service can be relocated as needed and a next path is created for it to be exercised by the test case until all paths have been exercised. The relocation of the service depends on the available resources and the number of paths tested in each iteration. If there are resources, the process can test more than one path. FIG. 4E shows that the runtime configuration state after completion of the test differs from the one in which the testing activity started, i.e., FIG. 4A, due to the relocation of the service during the testing.

FIG. 5A-5D are diagrams of one example embodiment of the small flip testing method. FIG. 5E is a flowchart of the small flip testing process. The small flip test method can be used to test configured instances when there is a risk of potential interferences, and, for which the number of currently required components is less than the number of unused nodes that can be used by this configured instance. For instance, the small flip can be used for a configured instance which can have components on six nodes and that, at the time of testing, requires only two components. Thus, the small flip test method can be used for testing a configured instance that, at the time of testing, requires k components out of the maximum n, where k<=n/2.

FIG. 5E is a flowchart of one embodiment of the process of the small flip test. The small flip process can begin with determining paths for testing a service by examination of configuration information for each configured instance for that service (Block 501). The process continues by instantiating k components under test for the configured instance being tested on k available nodes (Block 503). The process instantiates the test configuration components to create the test environments under which the k components under test are to be tested (Block 505). Test all the paths or a selected subset of the paths which can be executed, and which involve the k instantiated components under test until all the paths or a selected subset of the paths have been tested (Block 507).

Once all the paths or a selected subset of the paths have been tested, the process takes snapshots of the k serving components, and replaces the k components under test with k serving components cloned from the snapshots (Block 509). The process then relocates the production traffic to the k new serving components (Block 511). With the production traffic relocated, the process executes the test cases for components on the rest of the nodes using the single step test method (Block 513).

Figure 5A:
FIG. 5A-5D is a diagram of one embodiment of an iteration of a small flip testing method.
Figure 5A:
Figure 5A:
Figure 5A:
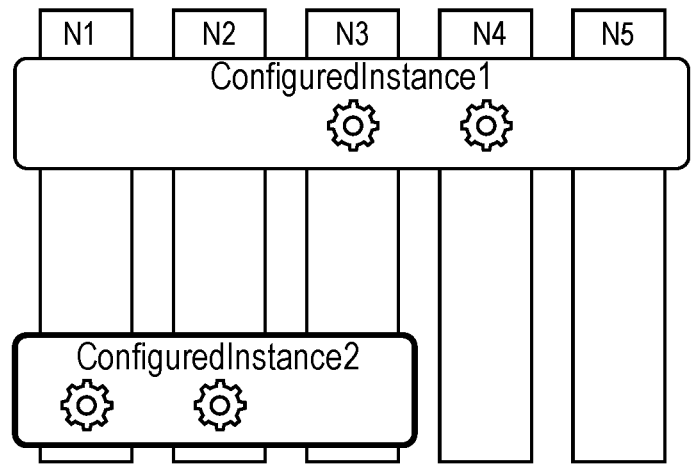
Figure 5B:
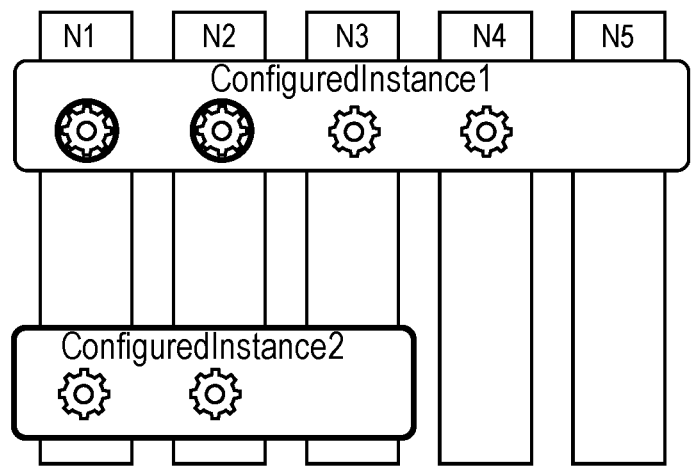
Figure 5C:
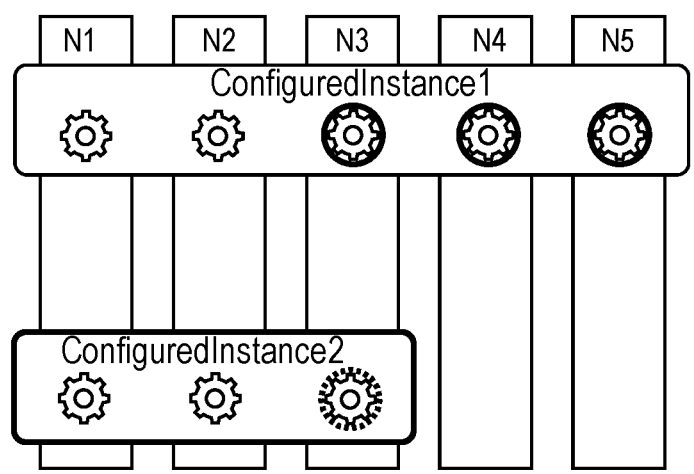
Figure 5D:
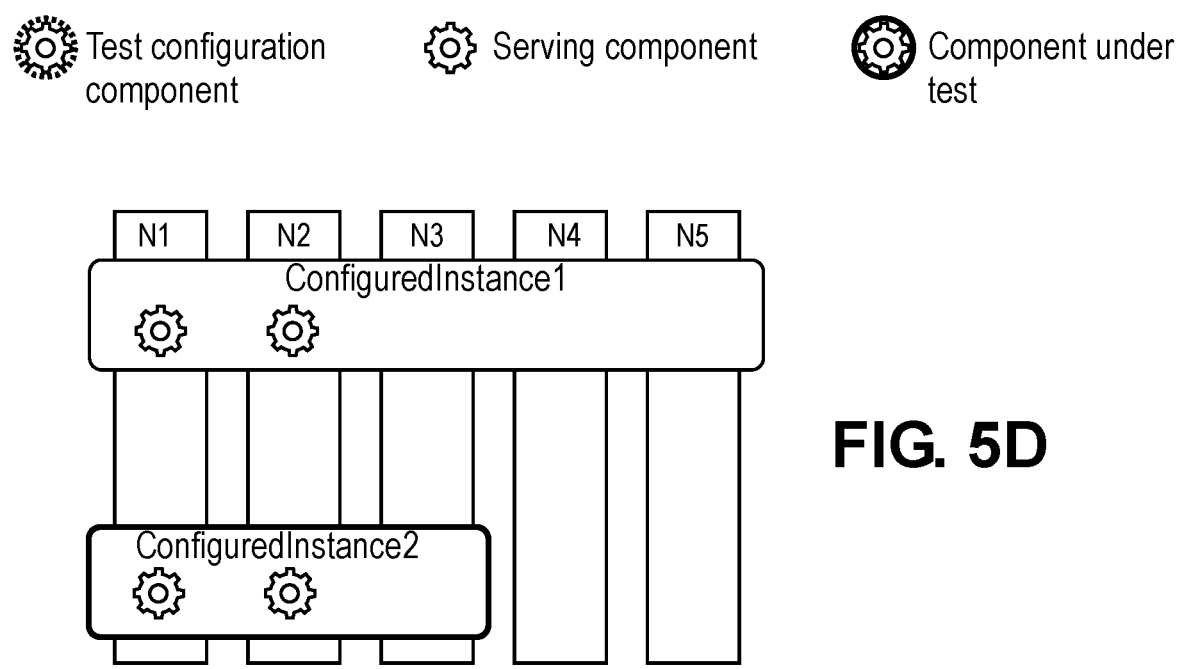
Figure 5E:
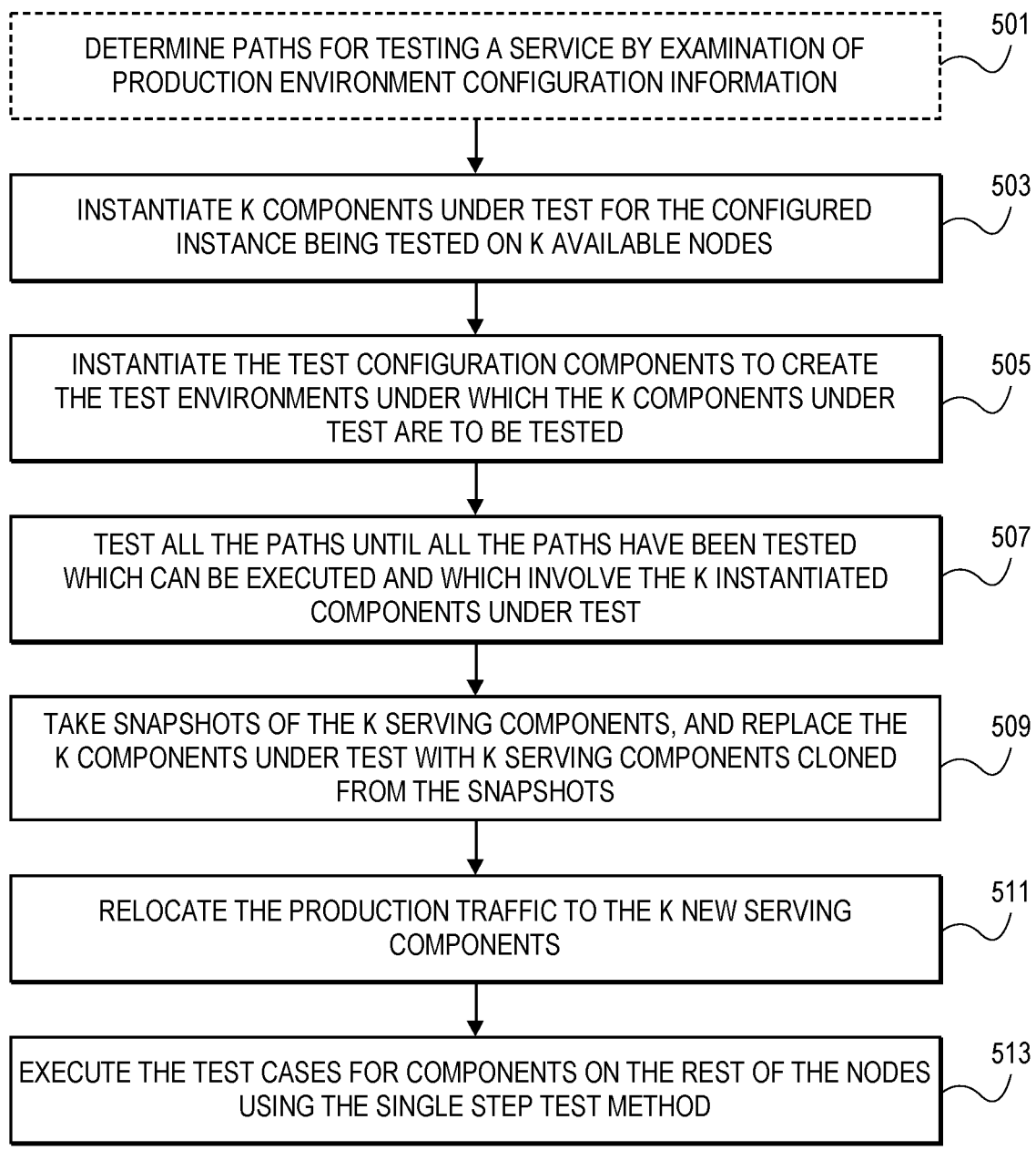
FIG. 5E is a flowchart of one embodiment of the small flip testing process.

FIG. 5A-D illustrate some iterations of the small flip test method when used to test a service composed of a single service instance that is provided using ConfiguredInstance1. The small flip is used to test configured instances that present a potential risk of interference between the live test and the executing production environment, however, the resources available allow for exercising at least k paths in each iteration. The starting point of the testing is shown in FIG. 5A. In the first iteration shown in FIG. 5B two paths are exercised. The small flip results in one service relocation shown in FIG. 5C when used for only one configured instance involved in providing the service being tested. FIG. 5C shows the application of the single step test method to the remaining nodes. FIG. 5D shows the runtime configuration state after completion of the small flip process. When the service being tested is composed of more than one service instance and, therefore more than one configured instance (of the configured instances providing these service instances) is being tested using the small flip, this may result in more than one service relocation for some configured instances.

Figure 6A:
FIG. 6A-6C is a diagram of one embodiment of an iteration of a big flip testing method.
Figure 6A:
Figure 6A:
Figure 6A:
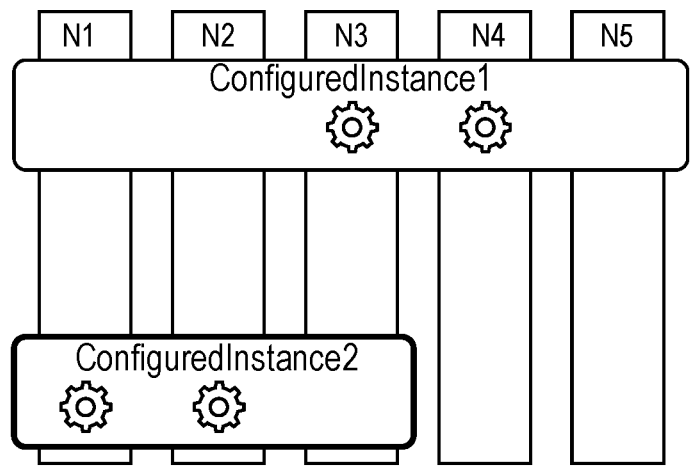
Figure 6B:
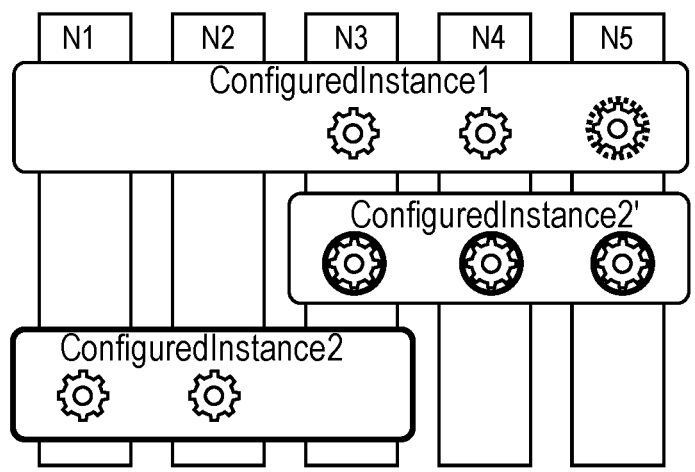
Figure 6C:
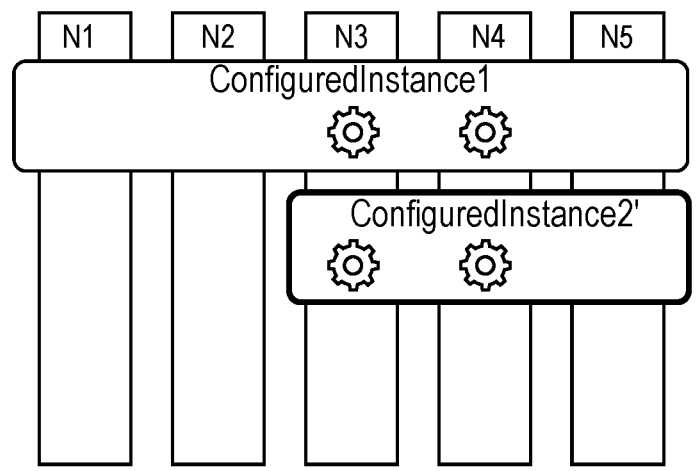
Figure 6D:
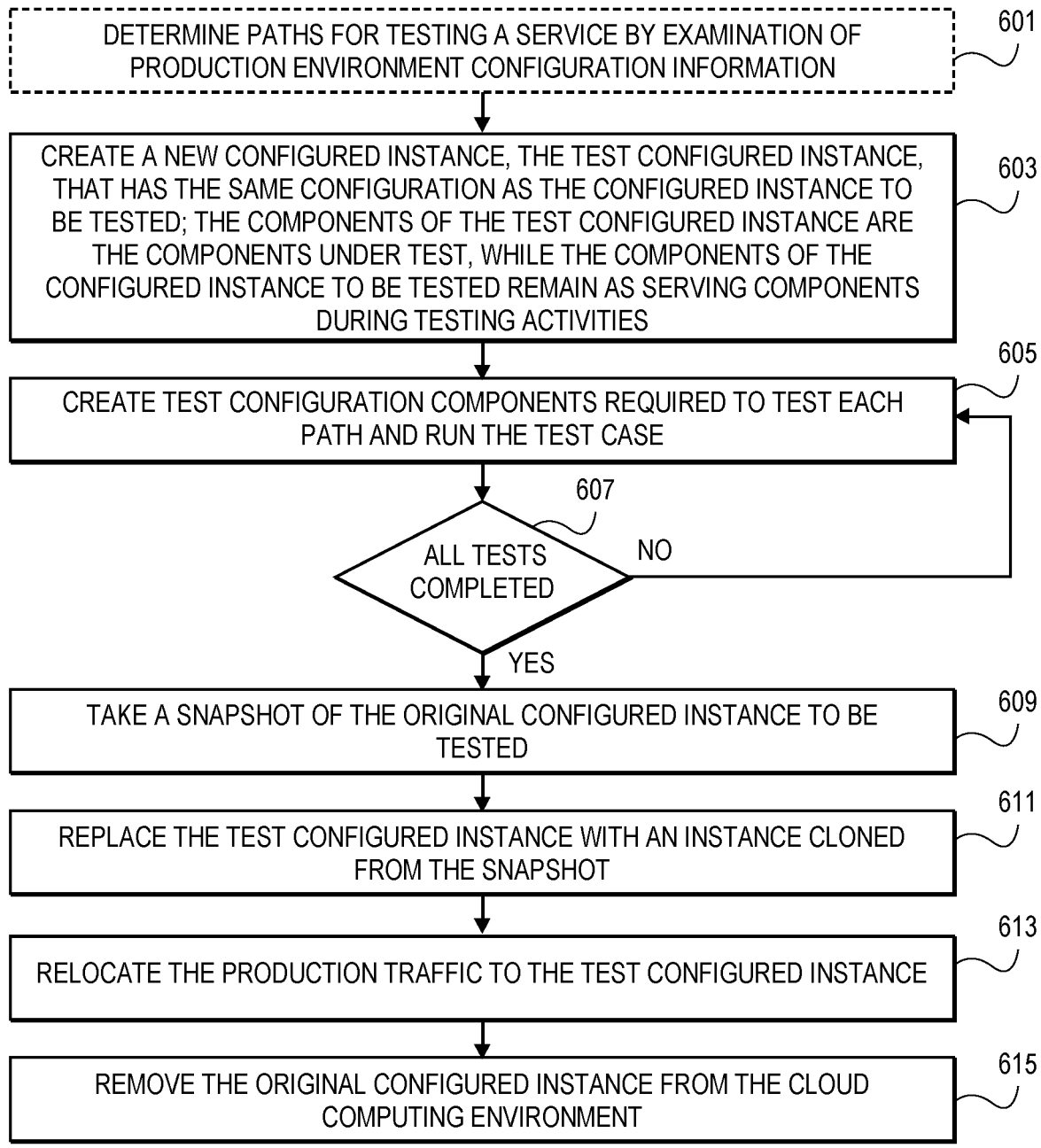
FIG. 6D is a flowchart of one embodiment of the big flip testing process.

FIGS. 6A-6C are diagrams of one example embodiment of the big flip testing method. FIG. 6D is a flowchart of the big flip testing process. The big flip is the test method which induces the least service disruption and takes the shortest time. However, among the test method discussed here it has the highest resource consumption. This can make it sometimes inapplicable.

The process of the big flip test method is illustrated in FIG. 6D. The process can begin with determining paths for testing a service by examination of configuration information for each configured instance for that service (Block 601). The process continues, for each configured instance to be tested, by creating a new configured instance, the test configured instance, that has the same configuration as the configured instance to be tested (Block 601). The components of the test configured instance are the components under test, while the components of the configured instance to be tested remain as serving components during testing activities. The process then creates test configuration components required to test each path and execute the test case (Block 603). A check is then made whether all of the tests have completed (Block 605). If all of the tests have not completed, then the next test is setup and run (Block 603).

After completing the tests, the process takes a snapshot of the original configured instance to be tested (Block 607). The process replaces the test configured instance with an instance cloned from the snapshot (Block 609). The process relocates the production traffic to the test configured instance (Block 611), which will make it the configured instance with the new serving components. The process then removes the original configured instance from the system (Block 613).

FIGS. 6A-6C shows how the big flip test method is used to test a service composed of one service instance provided using ConfiguredInstance2. FIG. 6A shows the starting conditions of the cloud computing environment. As shown in FIG. 6B, a new instance of ConfiguredInstance2 (ConfiguredInstance2') is instantiated on nodes that are available to host it. Such nodes are identified by taking into consideration information from the system configuration such as, software installed on each node, anti-affinity rules, and similar conditions. The new configured instance is then used to perform the tests under different paths, which are production environments in this case as the service is composed of only one service instance. After the tests for all paths pass, the tested configured instance is replaced by one cloned from the original configured instance, which becomes the configured instance with the serving components (i.e., the service relocation from the original instance to the new configured instance), and the original configured instance is terminated as shown in FIG. 6C.

The test methods of the embodiments were described by way of example to apply to a single configured instance, however, a test case often involves more than one configured instance. It is possible to combine the test methods of the embodiments throughout the path traversed by the test case. This combination of test methods, in some embodiments, can be selected to conform to the following rules (1) the big flip can be combined with any other test methods, (2) the single step test method can only be used if throughout the paths traversed by the test case only the single step or the big flip are used, and (3) the rolling paths test method and the small flip test method can be used together, and even combined with the big flip.

A service in a cloud computing environment needs to be tested against all possible runtime configuration states of the system providing it. In other words, for services in a cloud computing environment, the notion of "test case passed" is redefined to "a test case passes only when it passes against all possible applicable runtime configuration states."

The testing method have been described as being utilized to test all applicable runtime configuration states. Testing a service against all its applicable runtime configuration states is necessary, however it is very costly in terms of time and resources in the cloud computing environment. For example, a service could be composed of only one service instance protected by a configured instance where the components can be on any one of ten dedicated nodes (not shared with any other configured instance). For a normal functional test case, a testing process will have to run this test case ten times to test this service against all its applicable runtime configuration states (once per node). In the case of a stress test case, and if it is assumed the maximum size of the configured instance is four components, the test case will need to be executed 210 times ($C_{10}^4$ times, without considering the scaling steps). These numbers increase when the paths to be taken by the test case involve more than one configured instance, i.e., testing a service that is composed of more than one service instance. Thus, covering all the runtime configuration states may be impossible for complex and large systems.

To tackle the complexity and the high cost of testing against all runtime configuration states some embodiments limit testing to testing against a representative set of runtime configuration states. A runtime configuration state is described via the production environments in which each service instance is provided; as a result, identifying the representative set of runtime configuration states consists of identifying the component environments that describe the runtime configuration states in this set. Because any component environment has two elements, i.e., location and collocation, such component environments can be derived in two mutually non-exclusive ways, first, collocation-wise, for a given set of locations on which a configured instance is deployed, the process can identify the component environments with the biggest collocations per location which are referred to herein as 'boundary environments.' In other words, the collocation set of a component environment that has that same location is a subset of the collocation set of the boundary environment. Two component environments are said to have the same boundary environment if they have the same maximum collocation and equivalent locations, i.e. same network, and hosts of identical specifications.

The second method of derivation is location-wise, for a given set of collocations of components of a given configured instance and a maximum number of N components, the process can identify various assignments of N collocations to N locations as allowed by the configuration. Such assignments are referred to herein as 'mixtures of environments.' Such assignments may or may not allow the reuse of collocations as the configuration allows it. Two mixtures are said to have equivalent assignments if their assignments involve the same set of collocations in equivalent locations with the same numbers of occurrence of each collocation per location class.

By identifying the boundary environments in a cloud computing environment, the embodiments can group the nodes of the cloud computing environment into groups that have the same boundary environment. Similarly, by identifying mixtures of environments the embodiments can group them into mixtures which involve the same set of collocations with the same number of occurrences of each collocation per location class.

The embodiments use the groupings (location-wise and collocation-wise) to group runtime configuration states into equivalence classes taking into consideration the component environments they involve. In other words, test runs should cover runtime configuration states that involve boundary environments, and mixture of environments that were derived from collocations of boundary environments and that involve as many boundary environments as possible. The rationale behind this method is based on boundary environments presenting the worst case of resource sharing under which a test can put the component under test; therefore, if a property holds under the circumstances of the boundary environment it will hold under all its sub-environments, and boundary environments allow for grouping nodes into equivalence classes. As a result, one node that replicates the boundary environment is considered representative of all the nodes that can host that boundary environment. These properties enable the embodiments to reduce the number of paths, and as a result the number of runs, the test case should go through.

Using the boundary environments, the process can define the set of paths that should be executed by the test case. The set of paths depends also on the nature of the test case itself. A functional test case will only need to target boundary environments of the configured instances. However, for stress tests, for instance, the embodiments use mixtures of boundary environments as well as see how the service behaves when these are chained with various mixtures of the other configured instances involved in the test case.

Figure 7A:
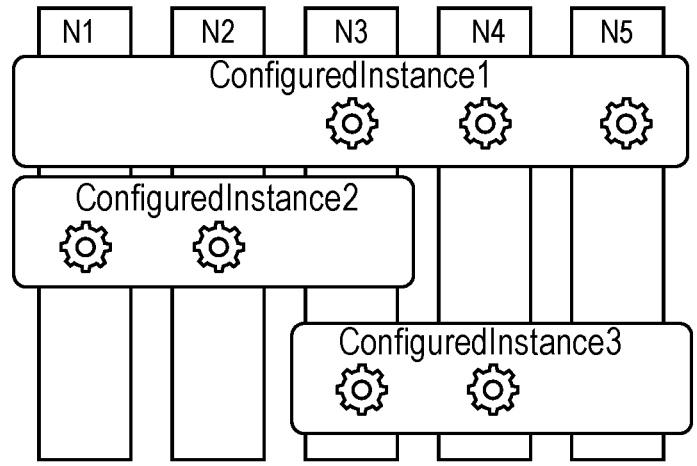
FIG. 7A-7G is a diagram of one embodiment of mixtures and combinations against which a service instance is to be tested.

FIGS. 7A-7G shows an example in which a service composed of two service instances that are provided (and protected) by two configured instances (ConfiguredInstance1 and ConfiguredInstance2) undergoing a stress test. FIG. 7A captures the maximum instantiation level of both configured instances, in other words ConfiguredInstance1 can have up to 3 components, and ConfiguredInstance2 can have up to 2 components. In this example, all nodes are identical and are in the same network, ConfiguredIntsnace1 components may serve under component environments with any of four collocations (for instance, collocation: none). The same applies to the components of ConfiguredInstance2. Furthermore, ConfigureInstance1 has three different collocations for the boundary environments, namely one shared only with ConfiguredInstance2 (for example on N1), one shared only with ConfiguredInstance3 (for example on N4), and one shared with both (on N3). Similarly, ConfiguredInstance2 has two collocations for the boundary environments, one shared with only ConfiguredInstance1 and one shared with both ConfiguredInstance1 and ConfiguredInstance3.

Figure 7B:
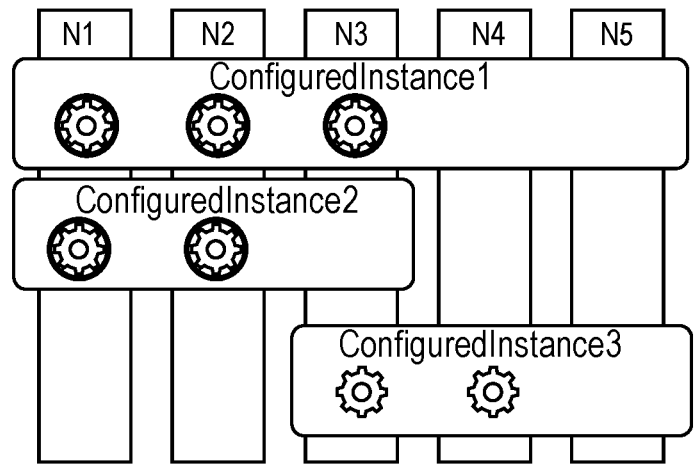
Figure 7C:
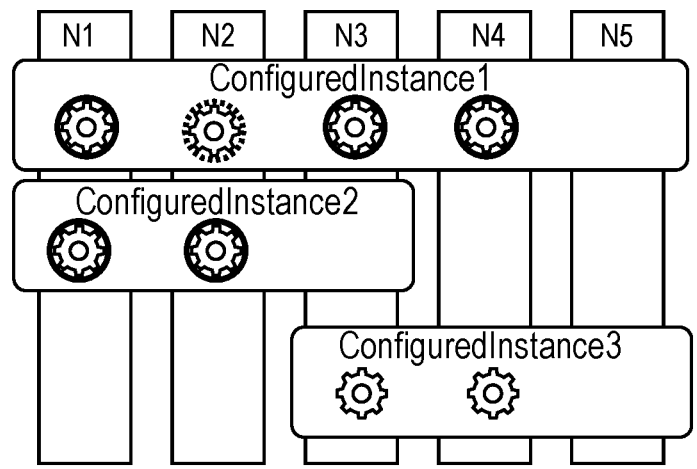
Figure 7D:
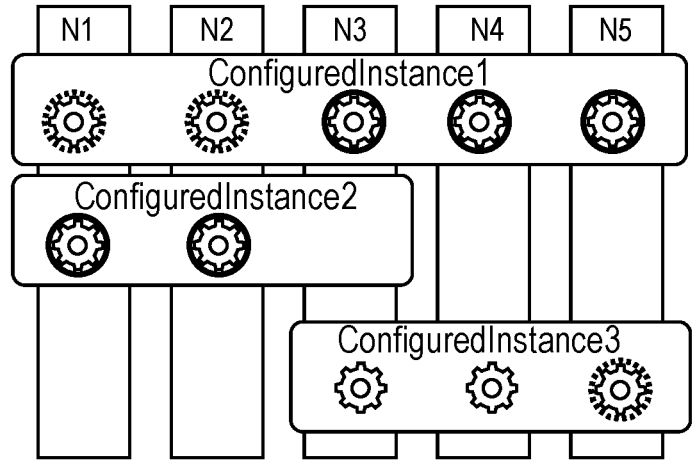
Figure 7E:
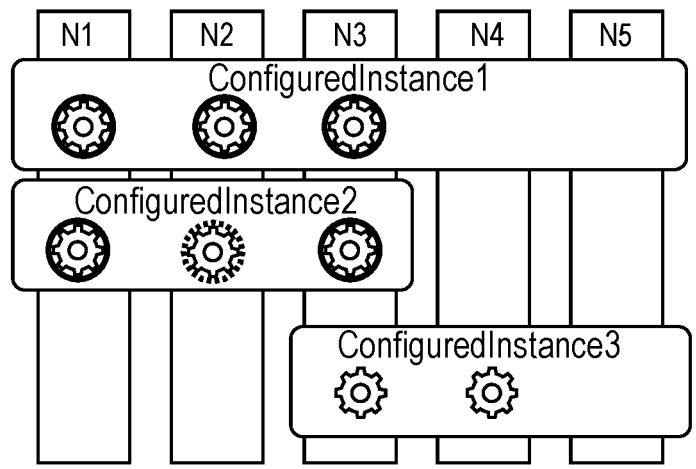
Figure 7F:
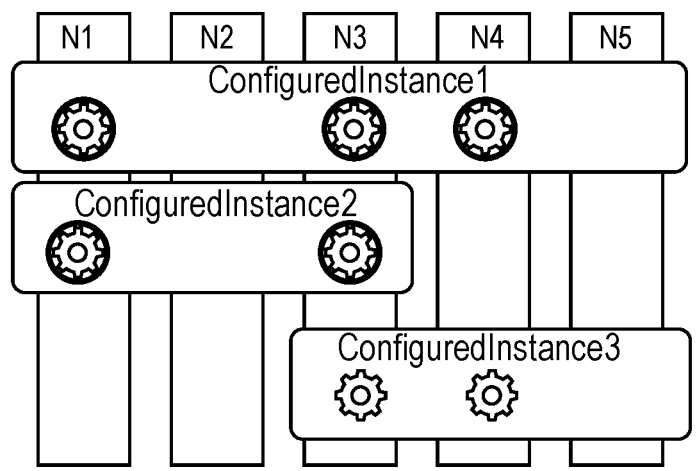
Figure 7G:
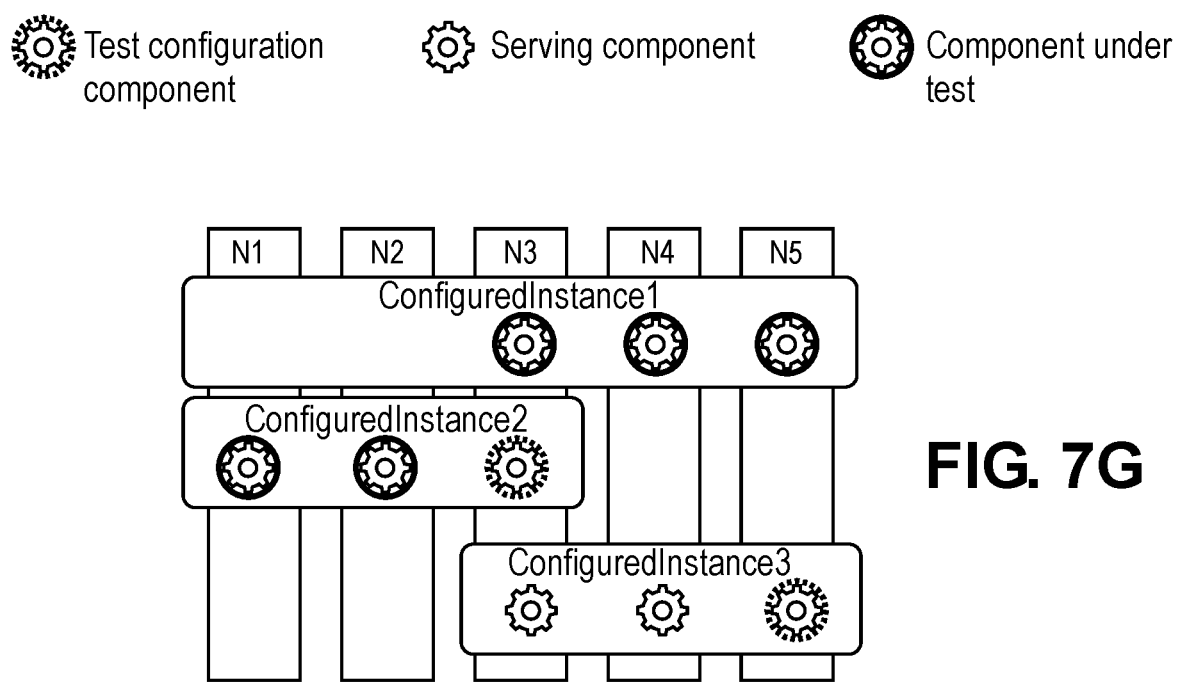

FIG. 7B to 7G capture some mixtures under which the service composed of the service instances may be provided by the configured instances. The illustrated examples of these Figures also capture some combinations of these mixtures under which the stress test case has to be executed. Considering that all nodes are identical (same hardware specifications and residing in the same network), collocation-wise the process can derive the boundary environments of ConfiguredInstance1 as {BE1.1: {location: {N1 or N2}, collocation: components of {ConfiguredInstance2}}, BE1.2: {location: {N3}, collocation: components of {ConfiguredInstance2, ConfiguredInstance3}}, BE1.3:{location: {N4 or N5}, collocation: components of {ConfiguredInstance3}}}. Similarly, the set of boundary environments of ConfiguredInstance2 are {BE2.1: {location: {N1 or N2}, collocation: components of {ConfiguredInstance1}}, BE2.2: {location: {N3}, collocation: components of {ConfiguredInstance1, ConfiguredInstance3}}}. Knowing that ConfiguredInstance1 can have up to 3 components, then the process sets N=3 (number of locations to create mixtures of ConfiguredInstance1), and the process can create the mixtures of boundary environments for ConfiguredInstance1. The mixture used in FIG. 7B is {BE1.1, BE1.1, BE1.2} the complete set of mixtures of boundary environments of ConfiguredInstance1 is {Mx1.1 (as shown in FIG. 7B): {BE1.1, BE1.1, BE1.2}, Mx1.2 (as shown in FIG. 7E): {BE1.1, BE1.1, BE1.3}, Mx1.3: {BE1.3, BE1.3, BE1.1}, Mx1.4 (as shown in FIG. 7D and FIG. 7G): {BE1.3, BE1.3, BE1.2}, Mx1.5 (as shown in FIGS. 7C and 7F): {BE1.1, BE1.2, BE1.3}}. Similarly, the process can identify the mixtures of boundary environments for ConfiguredInstance2 by setting the number of locations N=2 (the maximum number of components ConfiguredInstance2 can have) {Mx2.1 (as shown in FIGS. 7B, 7C, 7D, and 7G): {BE2.1, BE2.1}, Mx2.2 (as shown in FIG. 7E, and FIG. 7F): {BE2.1, BE2.2}}. In different runtime configuration states, a service composed of service instances provided by ConfguredInstance1 and ConfiguredInstance2 may be provided by a combination of any mixture of environments of ConfiguredInstance1 and a mixture of environments of ConfiguredInstance2. As a result, instead of testing a combination of these mixtures the process can test mixtures of boundary environments as shown in the FIGS. 7B-7G. In other words, FIG. 7B shows tests being conducted under the combination (Mx1.1, Mx2.1), FIG. 7C shows the combination (Mx1.5, Mx2.1), FIG. 7D shows the combination (Mx1.4, Mx2.1), FIG. 7E shows the combination (Mx1.2, Mx2.2), FIG. 7F shows the combination (Mx1.5, Mx2.2), and FIG. 7G shows the combination (Mx1.5, Mx2.2).

A process can be configured to use various coverage criteria of the boundary environments as well as their mixtures in order to define the paths a test case has to exercise. In one embodiment, coverage criteria can be ordered in the descending order of their respective error detection power where (1) all boundary environments mixtures paths are tested, in this coverage the process identifies first all possible mixtures of boundary environments, then tests on all the paths that chain the mixtures of the configured instances involved in the test case; (2) pairwise boundary environments mixtures are tested, in this coverage the process identifies all possible mixtures of boundary environments, then generates a set of paths such as each pair of identified mixtures is in at least one path. To do so, the process can generate a covering array of strength 2 for the identified mixtures considering each configured instance as a factor and each mixture of a configured instance as a level of the factor representing that configured instance; (3) all boundary environments mixtures can be tested, in this coverage the process aims at testing a set of paths in which each mixture of boundary environments is used at least once; (4) all boundary environments paths are tested, in this coverage the process identifies first all the boundary environments, then tests on all the paths that chain the boundary environments of the configured instances involved in the test case; (5) pairwise boundary environments are tested, in this coverage the process identifies all possible boundary environments, then generates a set of paths such as each pair of identified boundary environments is in at least one path. Such paths can be generated in the same manner as described for the pairwise boundary environment mixtures. In a further case (6) all boundary environments are tested, in this coverage process aims at testing a set of paths in which each boundary environment is used at least once.

The embodiments can use any of these criteria to reduce the number of runs of a test case while maintaining an acceptable level of error detection power. To run a functional test case against the service composed of the service instances provided by the configured instances depicted in FIGS. 7A-7G. In one example, the embodiments may need twenty runs for that test case to cover all runtime configuration states, as compared to six runs using all boundary environments paths and pairwise boundary environments coverage criteria, or three runs for all boundary environments criterion. Similar reduction in the number of runs can be done for test cases that may involve component environment mixtures such as stress tests.

The test methods of the embodiments (e.g., the single step, rolling path, small flip, and big flip test methods), as described herein, run a test case against all possible paths or all paths that have been selected to be tested (where boundary environments and coverage criteria are applied) while reducing the impact of testing activities on the production traffic. This can be time consuming and may induce some intolerable service disruption due to service relocation in some cases. The embodiments further provide the use boundary environments along with the coverage criteria to reduce the number of paths under which the test case is to be run. The test methods can be modified by taking into account the concept of boundary environment and the coverage criteria in order to reduce the cost of running the test cases. Instead of all possible paths, with the concept of boundary environments and the coverage criteria the test methods will run the test cases only on paths generated given an environments-coverage criterion. The impact of such enhancement to the test methods can be summarized as reducing the time needed for testing by reducing the number of runs of the test case regardless of which test method is used for isolation, and reducing service disruption by reducing the number of service relocation when the small flip or rolling paths is used. The number of service relocations will be reduced for the rolling paths as it is equal to the number of runs. For the small flip, the number of service relocations needed to cover all paths is one, but can be two in some cases. Big flip and single step have a fixed number of service relocations regardless of the number of paths which is one service relocation for the big flip and none for the single step.

Figure 8:
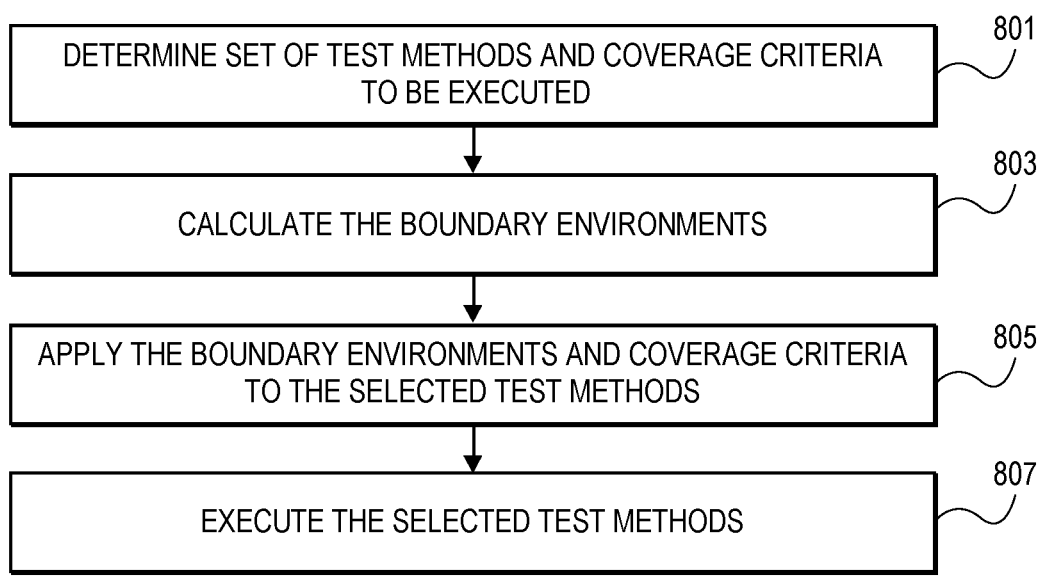
FIG. 8 is a flowchart of one embodiment of a process for reducing test runs utilizing boundary environments and coverage criteria.

FIG. 8 is a diagram of one embodiment of a process for employing boundary environments and coverage criteria in combination with the testing methods. The process can begin by determining the set of test methods (e.g., the single step, rolling path, small flip, big flip, or similar test methods) with their coverage criteria to be executed (Block 801). The boundary environments are then calculated for the selected set of test methods (Block 803). The process then applies the boundary environments and coverage criteria to the selected test methods (Block 807) identifying the subset of paths to be tested. The selected test methods can then be executed with the number of runs and paths reduced by the boundary environments and coverage criteria (Block 809).

Existing test methods used for testing in production environments can be enhanced as well using boundary environments and coverage criteria. Canary releases can be enhanced by wisely placing the components that expose the new version of the feature under test. In other words, the components that expose the new version of the feature should be placed on nodes that represent different boundary environments. Furthermore, as the rollout is progressing, the placement should aim to cover relevant mixtures of boundary environments as new users are being redirected to the new version. The same applies for the gradual rollout method.

Testing cloud services in the production environment has implications that cannot be addressed while testing in the development environment. On the one hand a process has to alleviate the risk of test interferences. On the other hand, the complexity and the heterogeneity of the cloud computing environment should be taken into consideration in order to obtain reliable test results. The set of test methods of the embodiments is applicable in different situations, that will enable live testing of services in a cloud computing environment. The application of boundary environments and coverage criteria in combination with the test methods can reduce the cost of testing services in a cloud computing environment.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application—specific integrated—circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

In some embodiments, the testing methods and application of boundary environments and coverage criteria as described herein is implemented in software as a test orchestrator 965 stored in the non-transitory machine readable storage media 918. The test orchestrator 965 can be part of the networking software 920. Any of the functions or aspects of the test methods, boundary environments, and coverage criteria can be implemented or supported by the test orchestrator 965 in the special purpose device 902.

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and physical NIs 946, as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

In some embodiments, the testing methods and application of boundary environments and coverage criteria as described herein is implemented in software 950 as a test orchestrator 965 stored in the non-transitory machine readable storage media 948. The test orchestrator 965 can be part of the software 950. Any of the functions or aspects of the test methods, boundary environments, and coverage criteria can be implemented or supported by the test orchestrator 965 in the general purpose device 904.

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
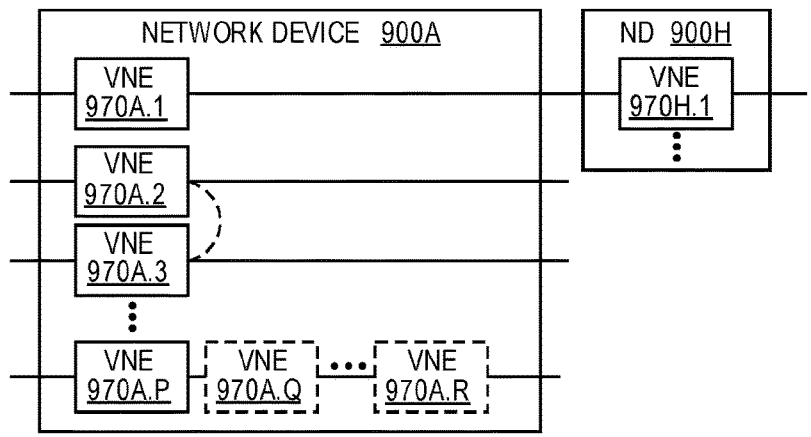
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
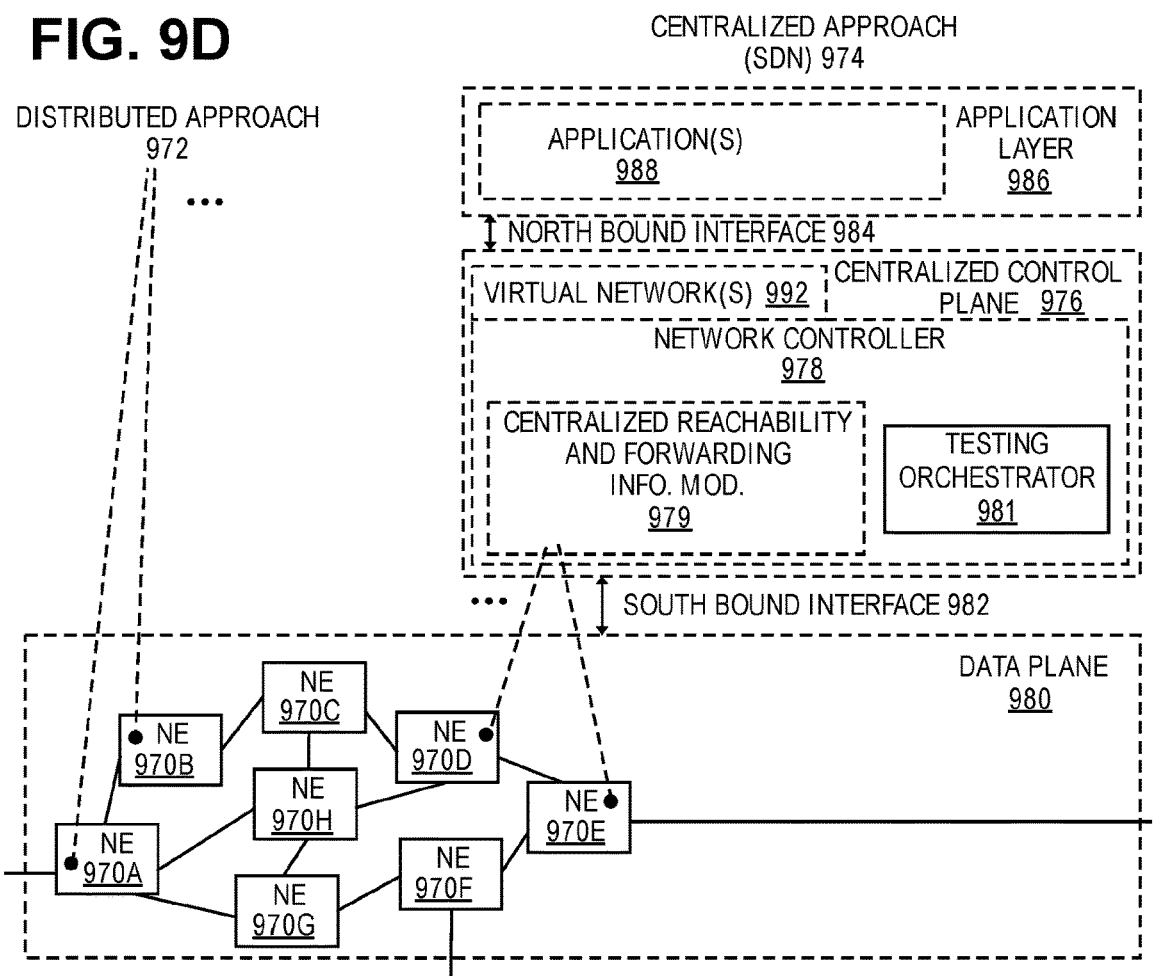
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

In some embodiments, the testing methods and application of boundary environments and coverage criteria as described herein is implemented in the centralized approach 974 as a test orchestrator 981. The test orchestrator 981 can be part of the network controller 978 or similar component. Any of the functions or aspects of the test methods, boundary environments, and coverage criteria can be implemented or supported by the test orchestrator 981 in the centralized approach 974.

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
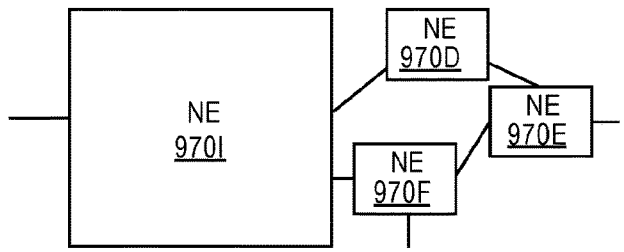
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
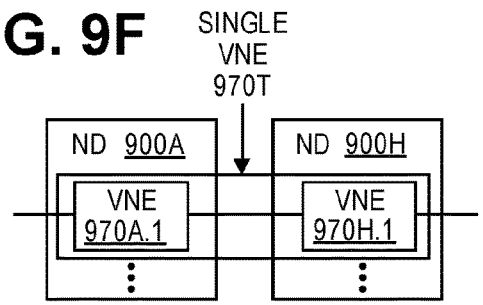
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
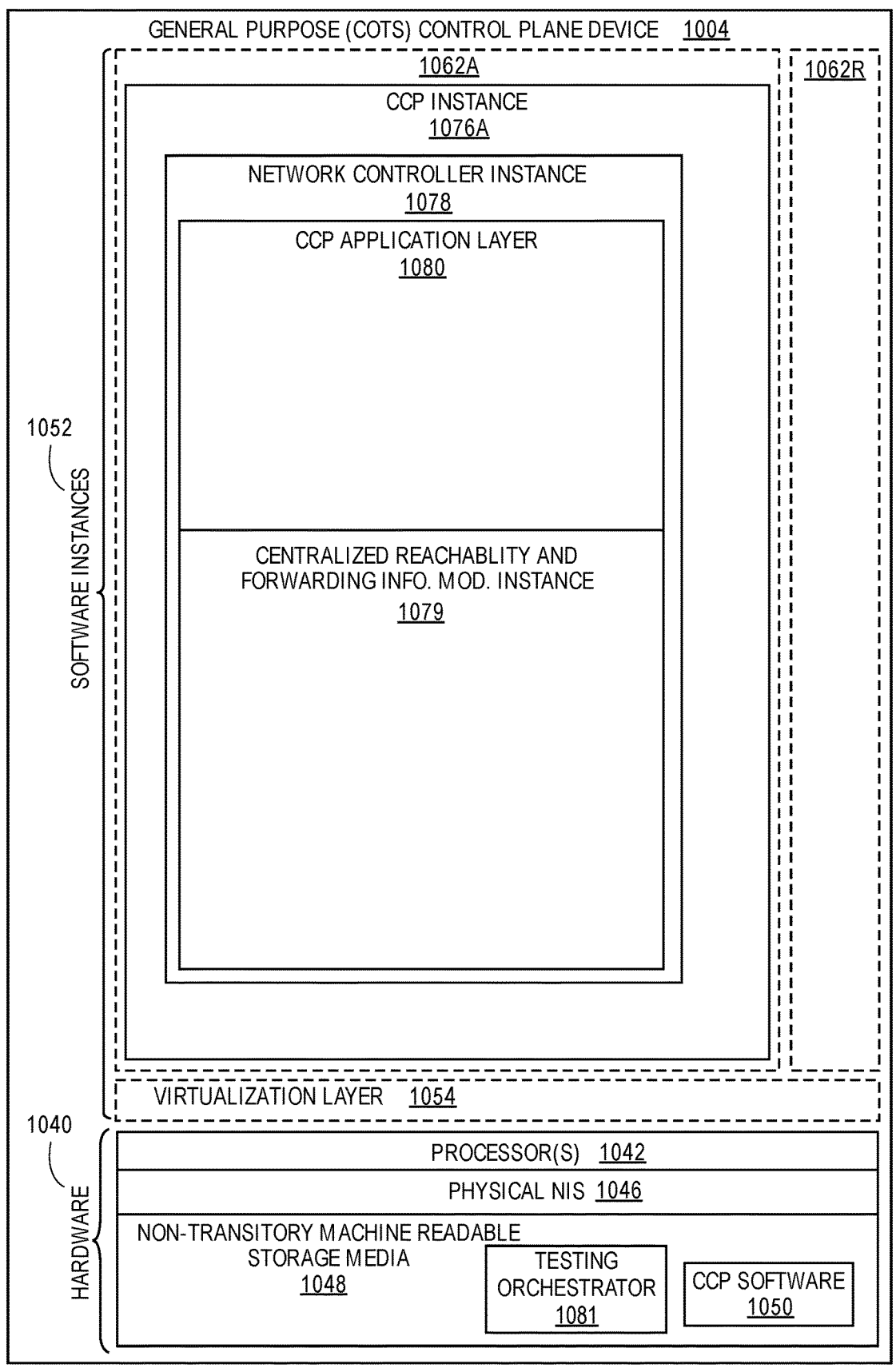
FIG. 10 illustrates a general purpose control plane device with centralized control plane (CCP) software 1050), according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and physical NIs 1046, as well as non-transitory machine readable storage media 1048 having stored therein centralized control plane (CCP) software 1050.

In some embodiments, the testing methods and application of boundary environments and coverage criteria as described herein is implemented in software as a test orchestrator 1081 stored in the non-transitory machine readable storage media 1048. The test orchestrator 1081 can be part of the software. Any of the functions or aspects of the test methods, boundary environments, and coverage criteria can be implemented or supported by the test orchestrator 1081 in the control plane device 1004.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Figure 11:
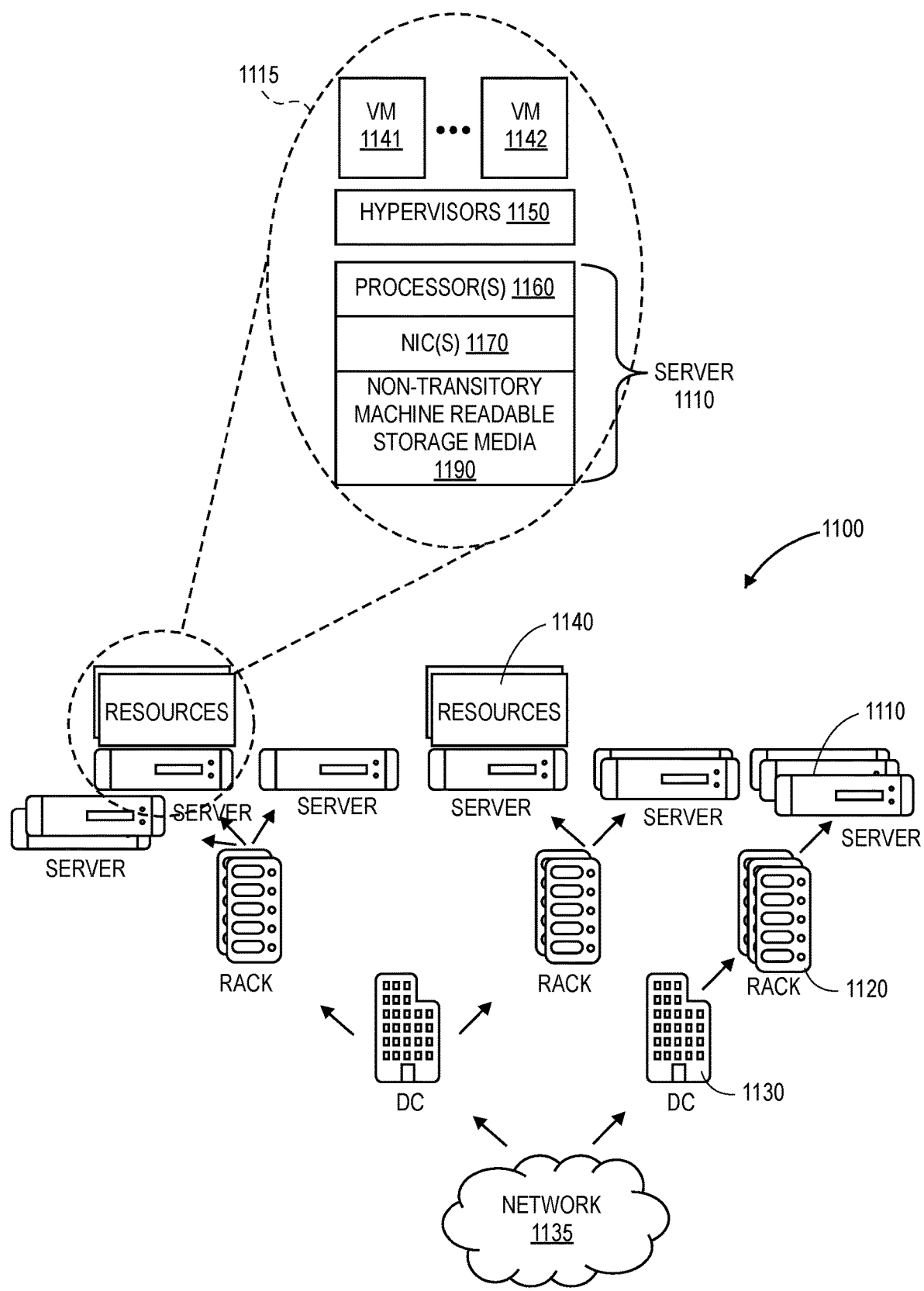
FIG. 11 is a diagram of one embodiment of a cloud computing environment.

FIG. 11 is an architectural overview of a cloud computing environment 1100 that comprises a hierarchy of a cloud computing entities. The cloud computing environment 1100 can include a number of different data centers (DCs) 1130 at different geographic sites connected over a network 1135. Each data center 1130 site comprises a number of racks 1120, each rack 1120 comprises a number of servers 1110. It is understood that in alternative embodiments a cloud computing environment may include any number of data centers, racks and servers. A set of the servers 1110 may be selected to host resources 1140. In one embodiment, the servers 1110 provide an execution environment for hosting entities and their hosted entities, where the hosting entities may be service providers and the hosted entities may be the services provided by the service providers. The server 1110 and its resources 1140, as well as the hosting and hosted entities provided by the server 1110, may execute and host the test orchestrator that implements any of the various embodiments as have been described herein.

Further details of the server 1110 and its resources 1140 are shown within a dotted circle 1115 of FIG. 11, according to one embodiment. The cloud computing environment 1100 comprises a general-purpose network device (e.g. server 1110), which includes hardware comprising a set of one or more processor(s) 1160, which can be commercial off-the-shelf (COTS) processors, dedicated Application Specific Integrated Circuits (ASICs), or any other type of processing circuit including digital or analog hardware components or special purpose processors, and network interface controller(s) 1170 (NICs), also known as network interface cards, as well as non-transitory machine readable storage media 1190 having stored therein software and/or instructions executable by the processor(s) 1160, as further described herein above in relation to FIGS. 9A-F and 10.

During operation, the processor(s) 1160 execute the software to instantiate a hypervisor 1150 and one or more VMs 1141, 1142 that are run by the hypervisor 1150. The hypervisor 1150 and VMs 1141, 1142 are virtual resources, which may run the test orchestrator according to the embodiments described herein. In one embodiment, the test orchestrator may be implemented on one or more of the VMs 1141, 1142 that run on the hypervisor 1150 to perform the various embodiments as have been described herein.

In an embodiment the test orchestrator can be initiated by a user or by a machine in different manners. For example, the user can input a command, e.g. by clicking a button, through a user interface to initiate the instantiation of the server instance. The user can alternatively type a command on a command line or on another similar interface. The user can otherwise provide instructions through a user interface or by email, messaging or phone to a network or cloud administrator, to initiate the instantiation of the server instance.

Embodiments may be represented as a software product stored in a machine-readable medium (such as the non-transitory machine readable storage media 1190, also referred to as a computer-readable medium, a processor-readable medium, or a computer usable medium having a computer readable program code embodied therein). The non-transitory machine-readable medium 1190 may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software miming from the machine-readable medium may interface with circuitry to perform the described tasks.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to live test a service in a production environment, where the service is provided by a set of configured instances in the production environment, and each configured instance is composed of a set of components, the method comprising:
   instantiating components under test from the set of components to setup paths that are to be taken by test traffic;
   instantiating test configuration components from the set of components for the service;
   executing a test case on a created path;
   generating a snapshot of a first serving component from the set of components;
   replacing a tested component under test from the set of components with a second serving component from the set of components cloned from the snapshot;
   relocating the service to the second serving component;
   replacing the first serving component of the snapshot with a new component under test to create a new path to be tested;
   determining whether all paths have been tested; and
   reducing a number of paths to be tested using boundary environments and coverage criteria, wherein reducing the number of paths to be tested using the boundary environments and coverage criteria, wherein the coverage criteria include any one or more of a first coverage criteria is testing on all paths that chain mixtures of the set of configured instances involved in the test case, a second coverage criteria is testing pairwise boundary environment mixtures where a set of paths with each pair of identified mixtures being in at least one of the set of paths, a third coverage criteria is testing all boundary environment mixtures, a fourth coverage criteria is testing all boundary environment paths for each path that chains boundary environments of the set of configured instances in the test case, or a fifth coverage criteria is testing pairwise boundary environments where possible boundary environments are identified and a set of paths generated where each pair of identified boundary environments are in at least one path, wherein the first coverage criteria to the fifth coverage criteria are ordered by their error detection power.

2. The method of claim 1, further comprising:
   determining paths for testing the service by examination of production environment configuration information.

3. The method of claim 1, wherein reducing a number of paths to be tested using boundary environments and coverage criteria, further comprising:
   determining a set of test methods to be applied with coverage criteria;
   calculating the boundary environments;
   applying the boundary environments and coverage criteria to the set of test methods to reduce the number of paths to be tested; and
   executing the set of test methods.

4. The method of claim 1, wherein the instantiating includes instantiating k components under test for a configured instance from the set of configured instances being tested on k available nodes where k is any number greater than zero, the method further comprising:
   testing all paths which can be executed and which involve the k instantiated components under test until all path have been tested.

5. The method of claim 4, wherein the generating includes generating a snapshot for each of the k serving components, wherein the replacing includes replacing the k instantiated components under test with k serving components cloned from the snapshot,
   wherein the relocating includes relocating production traffic to k new serving components, and the method further comprising:
   executing the test cases for components on the remaining nodes using a single step test method.

6. A machine-readable storage medium having instructions stored therein which, when executed by a processor, cause the processor to perform a set of operations to live test a service in a production environment, where the service is provided by a set of configured instances in the production environment, and each configured instance is composed of a set of components, the set of operations comprising:
   instantiating components under test from the set of components to setup paths that are to be taken by test traffic;

instantiating test configuration components from the set of components for the service;

executing a test case on a created path;

generating a snapshot of a first serving component from the set of components;

replacing a tested component under test from the set of components with a second serving component from the set of components cloned from the snapshot;

relocating the service to the second serving component;

replacing the first serving component of the snapshot with a new component under test to create a new path to be tested;

determining whether all paths have been tested; and reducing a number of paths to be tested using boundary environments and coverage criteria, wherein reducing the number of paths to be tested using the boundary environments and coverage criteria, wherein the coverage criteria include any one or more of a first coverage criteria is testing on all paths that chain mixtures of the set of configured instances involved in the test case, a second coverage criteria is testing pairwise boundary environment mixtures where a set of paths with each pair of identified mixtures being in at least one of the set of paths, a third coverage criteria is testing all boundary environment mixtures, a fourth coverage criteria is testing all boundary environment paths for each path that chains boundary environments of the set of configured instances in the test case, or a fifth coverage criteria is testing pairwise boundary environments where possible boundary environments are identified and a set of paths generated where each pair of identified boundary environments are in at least one path, wherein the first coverage criteria to the fifth coverage criteria are ordered by their error detection power.

7. The machine-readable storage medium of claim 6, wherein the set of operations further comprising:

determining paths for testing the service by examination of production environment configuration information.

8. The machine-readable storage medium of claim 6, wherein reducing a number of paths to be tested using boundary environments and coverage criteria, further comprising:

determining a set of test methods to be applied with coverage criteria;

calculating the boundary environments;

applying the boundary environments and coverage criteria to the set of test methods to reduce the number of paths to be tested; and executing the set of test methods.

9. The machine-readable storage medium of claim 6, wherein the instantiating includes instantiating k components under test for a configured instance from the set of configured instances being tested on k available nodes where k is any number greater than zero, the set of operations further comprising:

testing all paths which can be executed and which involve the k instantiated components under test until all path have been tested.

10. The machine-readable storage medium of claim 9, wherein the generating includes generating a snapshot for each of the k serving components, wherein the replacing includes replacing the k instantiated components under test with k serving components cloned from the snapshot, wherein the relocating includes relocating production traffic to k new serving components, and the set of operations further comprising:

executing the test cases for components on the remaining nodes using a single step test method.

* * * * *